US010340077B2

(12) United States Patent
Miyamoto

(10) Patent No.: US 10,340,077 B2
(45) Date of Patent: Jul. 2, 2019

(54) FEED UNIT, FEED SYSTEM, AND ELECTRONIC DEVICE

(75) Inventor: Takashi Miyamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 1369 days.

(21) Appl. No.: 14/116,055

(22) PCT Filed: May 7, 2012

(86) PCT No.: PCT/JP2012/061645
§ 371 (c)(1),
(2), (4) Date: Mar. 5, 2015

(87) PCT Pub. No.: WO2012/157454
PCT Pub. Date: Nov. 22, 2012

(65) Prior Publication Data
US 2015/0170830 A1 Jun. 18, 2015

(30) Foreign Application Priority Data
May 19, 2011 (JP) .................. 2011-112349

(51) Int. Cl.
| H01F 38/14 | (2006.01) |
| H02J 50/12 | (2016.01) |
| H02J 50/90 | (2016.01) |
| H02J 50/40 | (2016.01) |
| H02J 50/70 | (2016.01) |
(Continued)

(52) U.S. Cl.
CPC ............. *H01F 38/14* (2013.01); *H01F 27/06* (2013.01); *H02J 5/005* (2013.01); *H02J 7/025* (2013.01); *H02J 50/12* (2016.02); *H02J 50/40* (2016.02); *H02J 50/70* (2016.02); *H02J 50/90* (2016.02); *H01M 10/46* (2013.01)

(58) Field of Classification Search
None
See application file for complete search history.

(56) References Cited

U.S. PATENT DOCUMENTS

2003/0098496 A1* 5/2003 Sugiyama ........... H01F 17/0006
257/531
2008/0266748 A1* 10/2008 Lee .......................... H02J 5/005
361/270
(Continued)

FOREIGN PATENT DOCUMENTS

| JP | 2008-136311 | 6/2008 |
| JP | 2009-504115 | 1/2009 |
(Continued)

OTHER PUBLICATIONS

Extended European Search Report issued in connection with related EP Application No. EP 12784991 dated Oct. 13, 2014.

*Primary Examiner* — Daniel Kessie
(74) *Attorney, Agent, or Firm* — Chip Law Group

(57) ABSTRACT

Provided are a feed unit, a feed system, and an electronic device that enable transmission efficiency control according to the position of a device when electric power transmission using a magnetic field is performed between devices. The feed unit includes a power transmission section including a power transmission coil configured to perform electric power transmission using a magnetic field, and an auxiliary resonance section including one or a plurality of resonators. The resonator includes an auxiliary coil wound to form a gap in at least a partial region.

19 Claims, 15 Drawing Sheets

(51) Int. Cl.
*H02J 5/00* (2016.01)
*H01F 27/06* (2006.01)
*H02J 7/02* (2016.01)
*H01M 10/46* (2006.01)

(56) References Cited

U.S. PATENT DOCUMENTS

| | | | |
|---|---|---|---|
| 2009/0046976 A1* | 2/2009 | Hillis | B82Y 20/00 385/8 |
| 2009/0230777 A1* | 9/2009 | Baarman | H01F 38/14 307/104 |
| 2010/0244579 A1 | 9/2010 | Sogabe et al. | |
| 2011/0115433 A1* | 5/2011 | Lee | H01F 38/14 320/108 |
| 2012/0146580 A1* | 6/2012 | Kitamura | H01F 38/14 320/108 |

FOREIGN PATENT DOCUMENTS

| | | | | |
|---|---|---|---|---|
| JP | WO 2011036863 A1 * | 3/2011 | ............. | H01F 38/14 |
| WO | WO/2008/044875 A1 | 4/2008 | | |
| WO | WO/2011/036863 A | 3/2011 | | |

\* cited by examiner

[ FIG. 1 ]
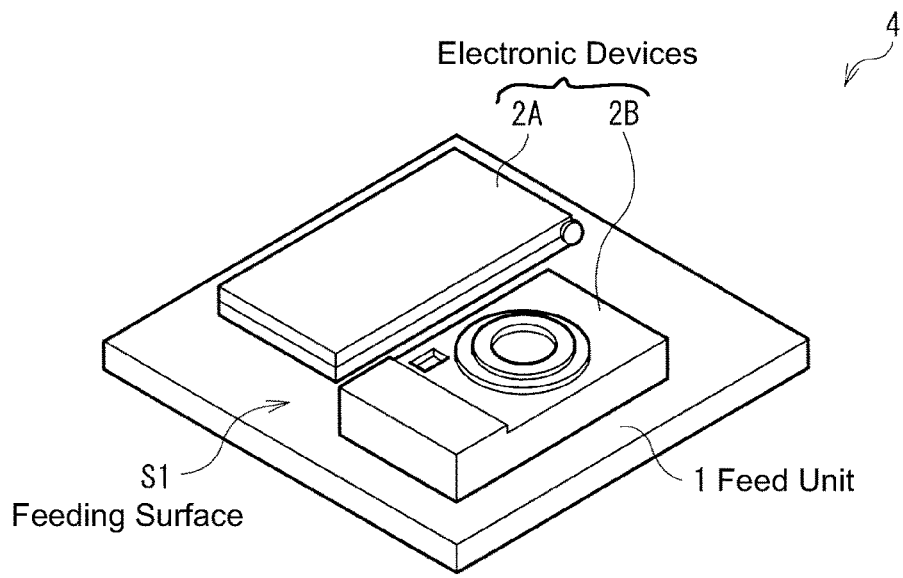
[ FIG. 2 ]
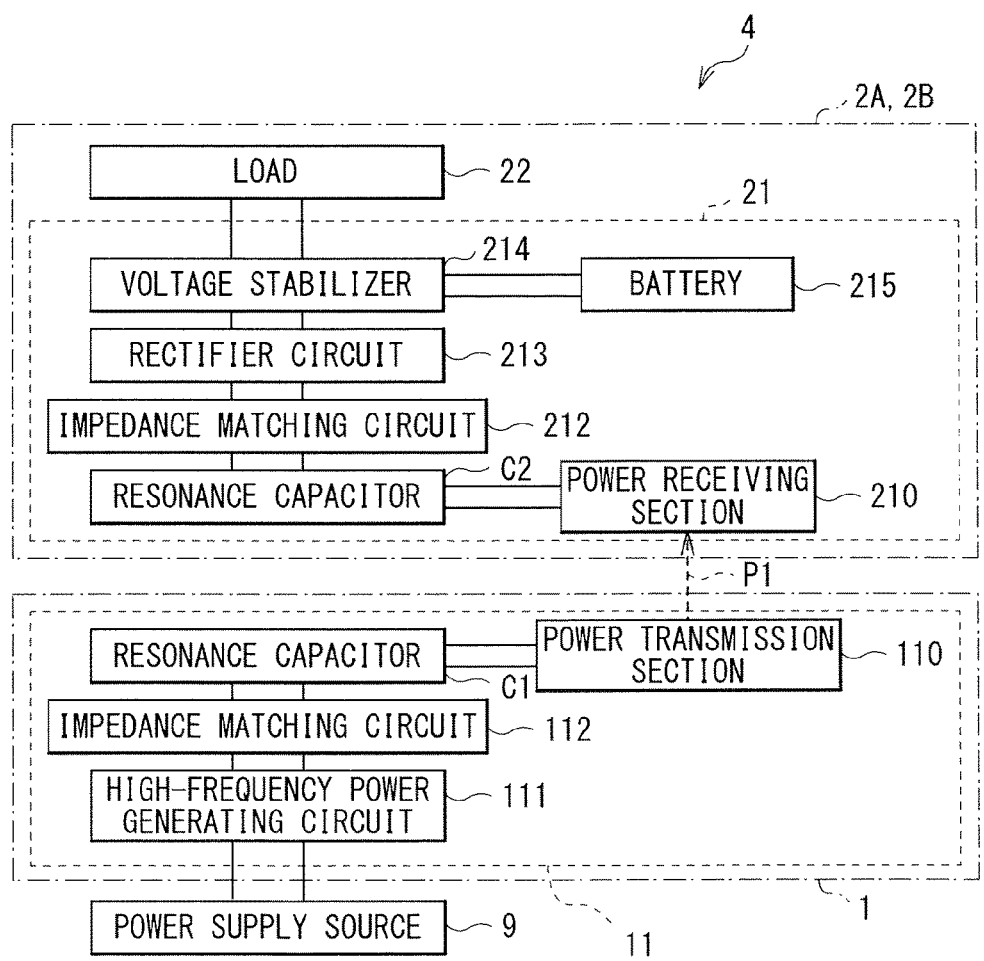

[ FIG. 3 ]
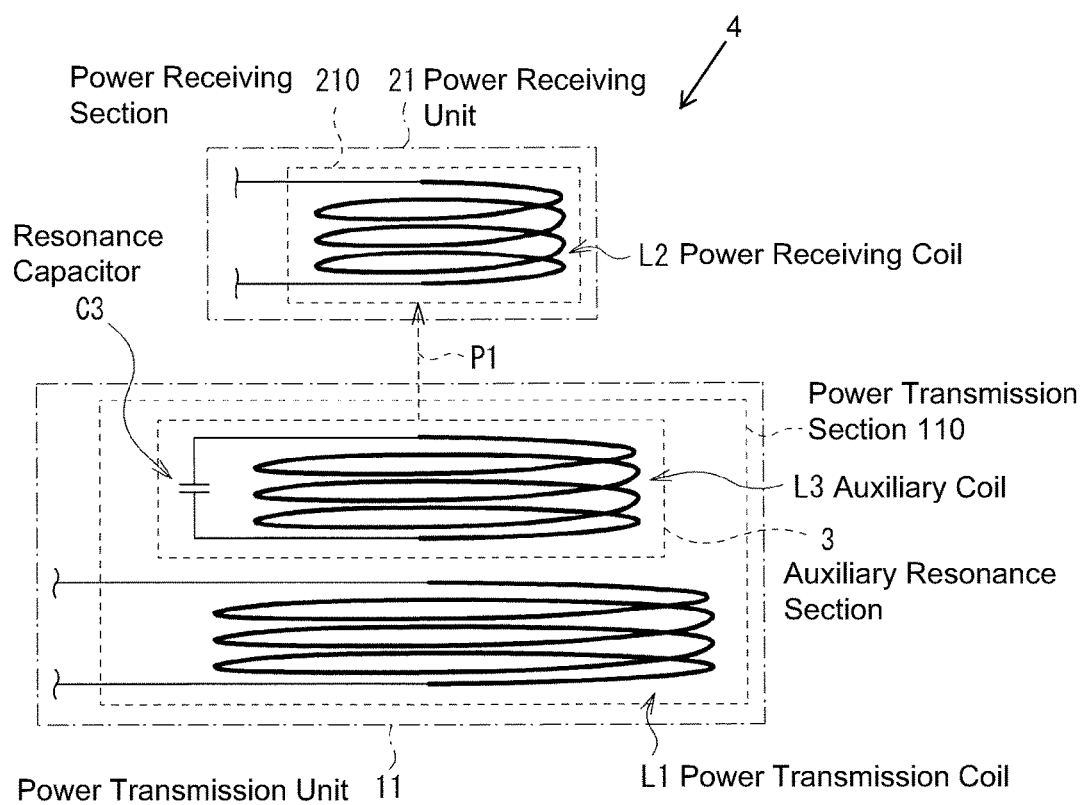

[ FIG. 4 ]
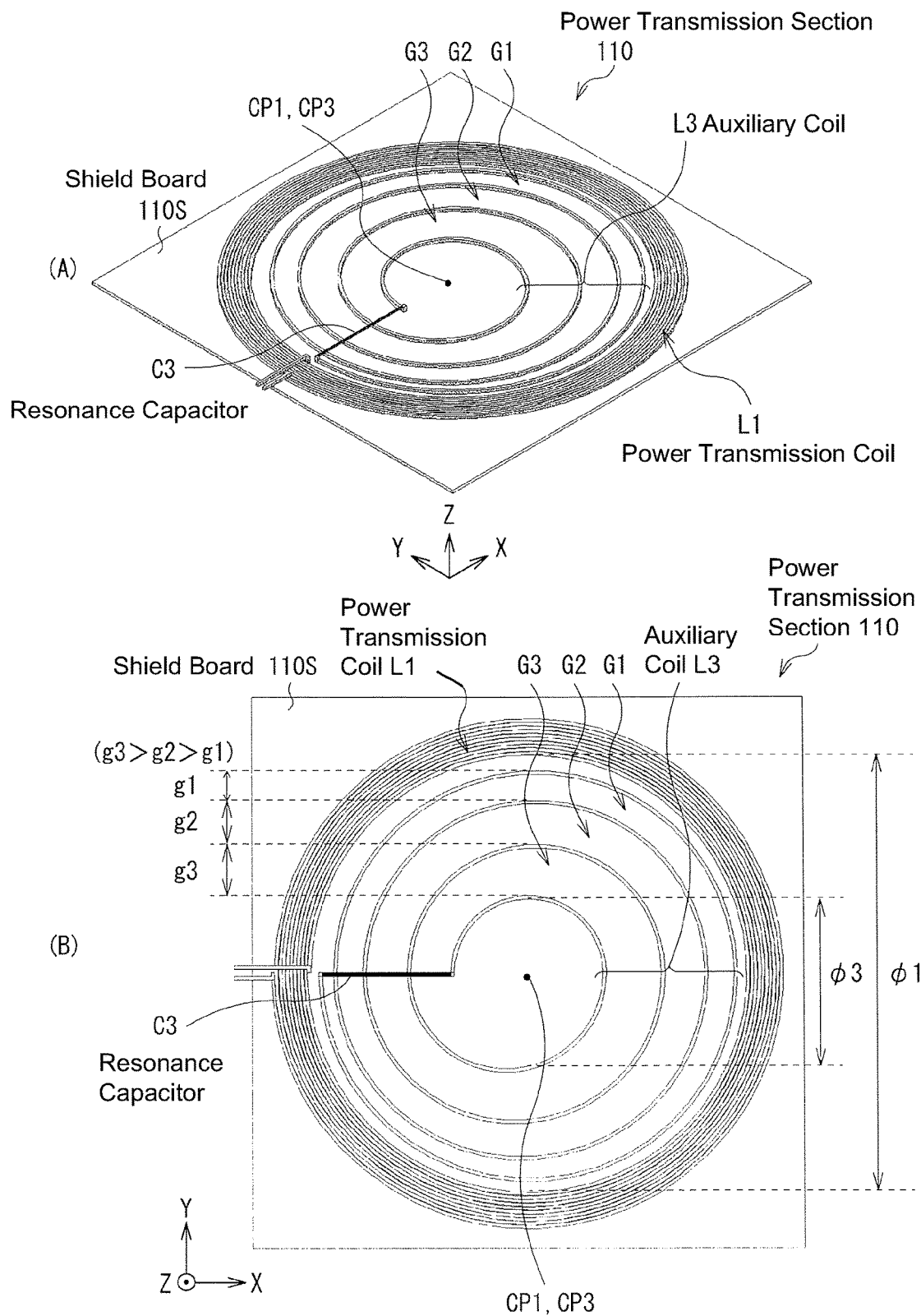

[ FIG. 5 ]
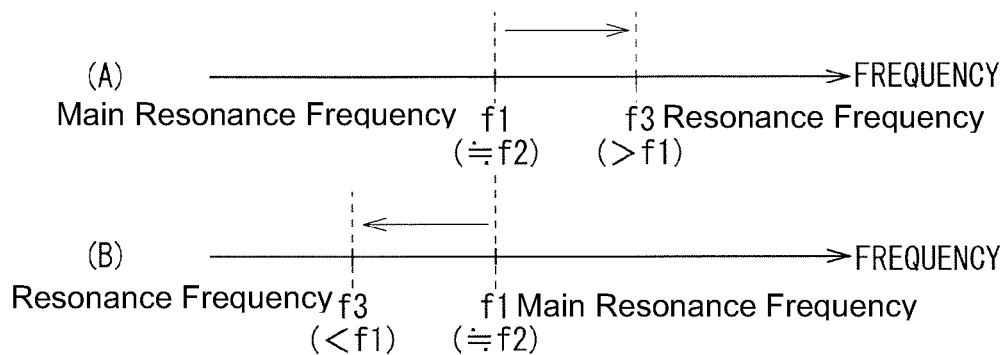

[ FIG. 6 ]
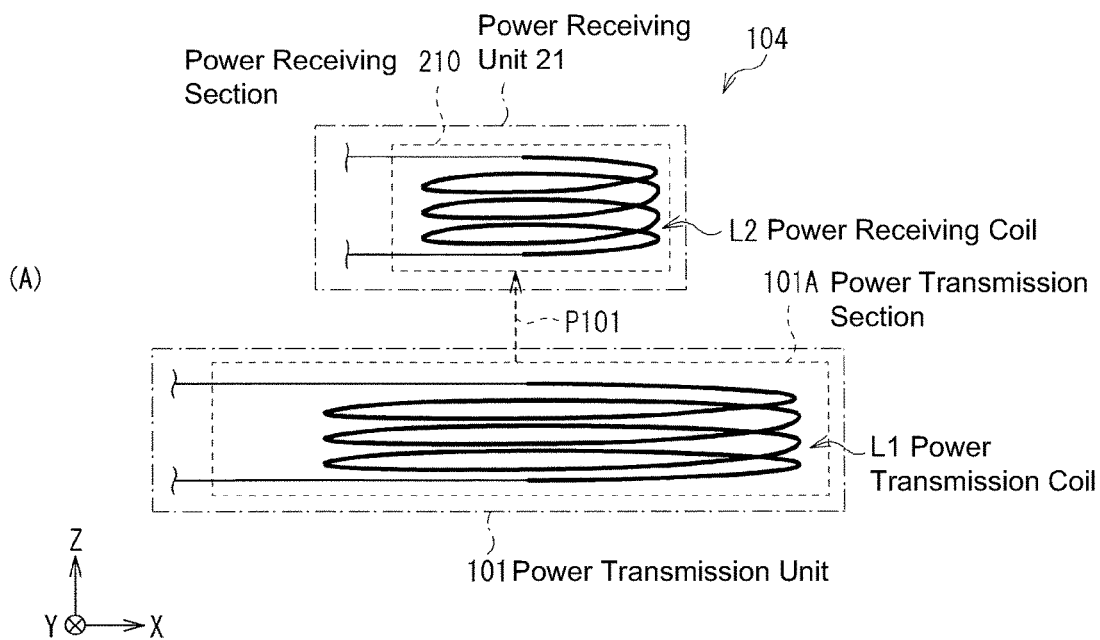
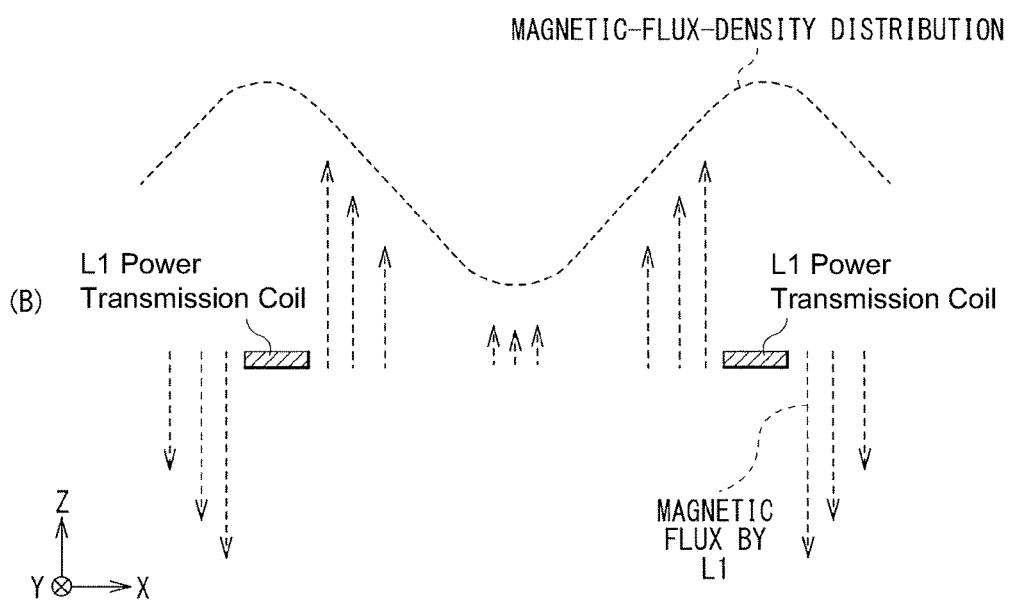

[ FIG. 7 ]
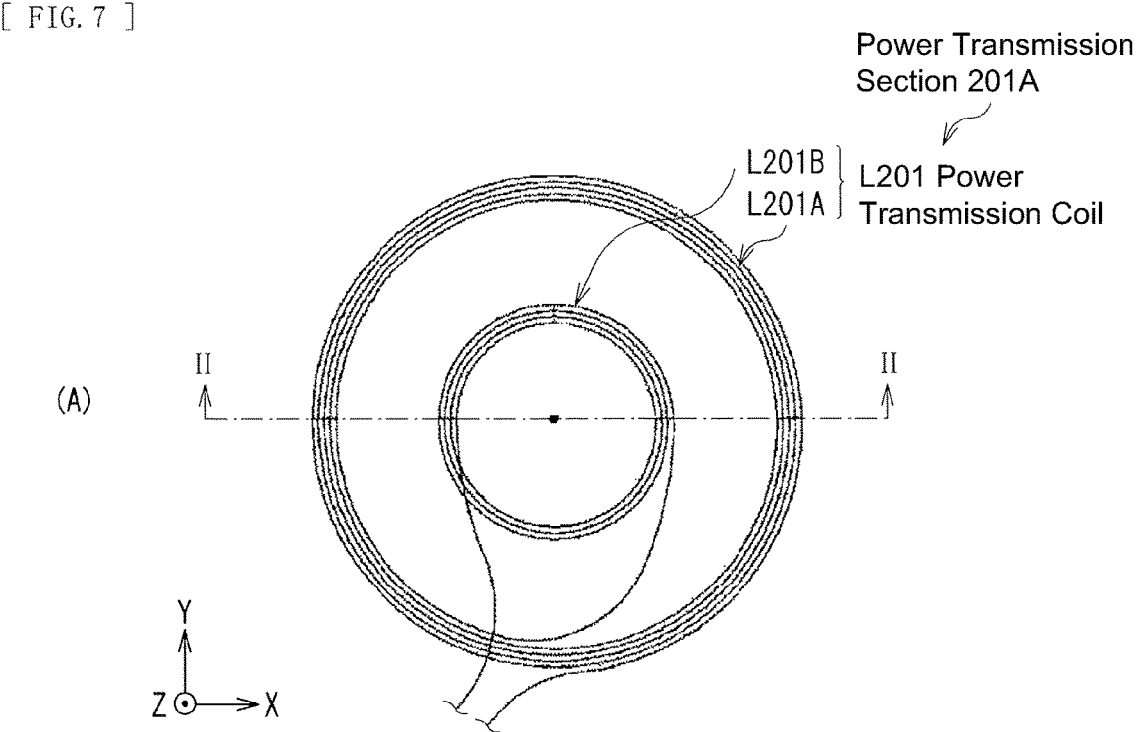
(A)
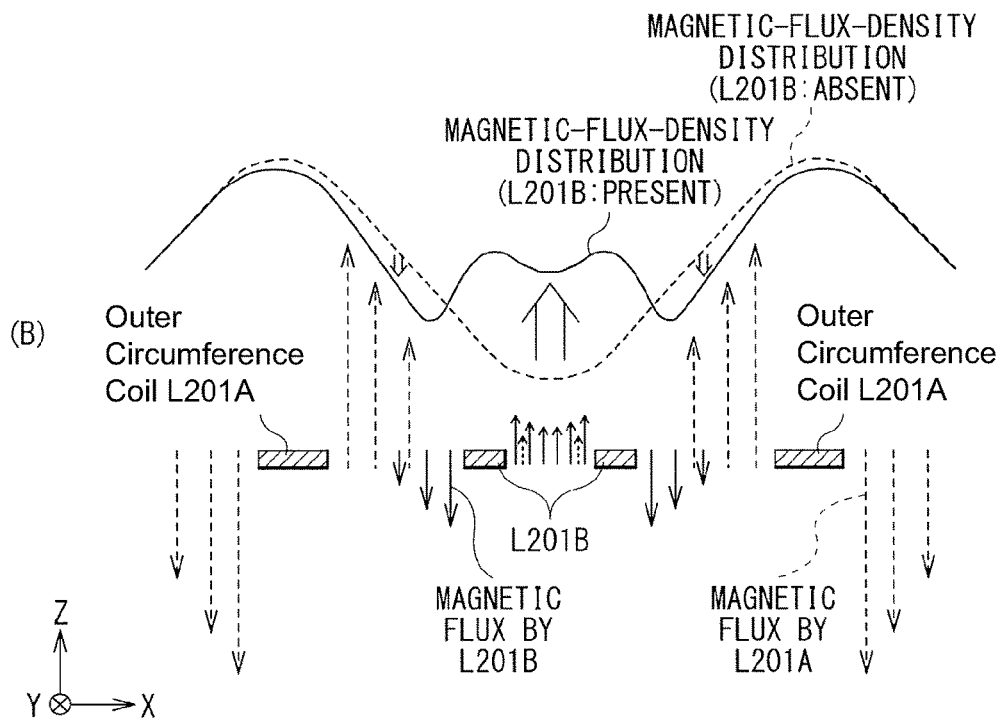
(B)

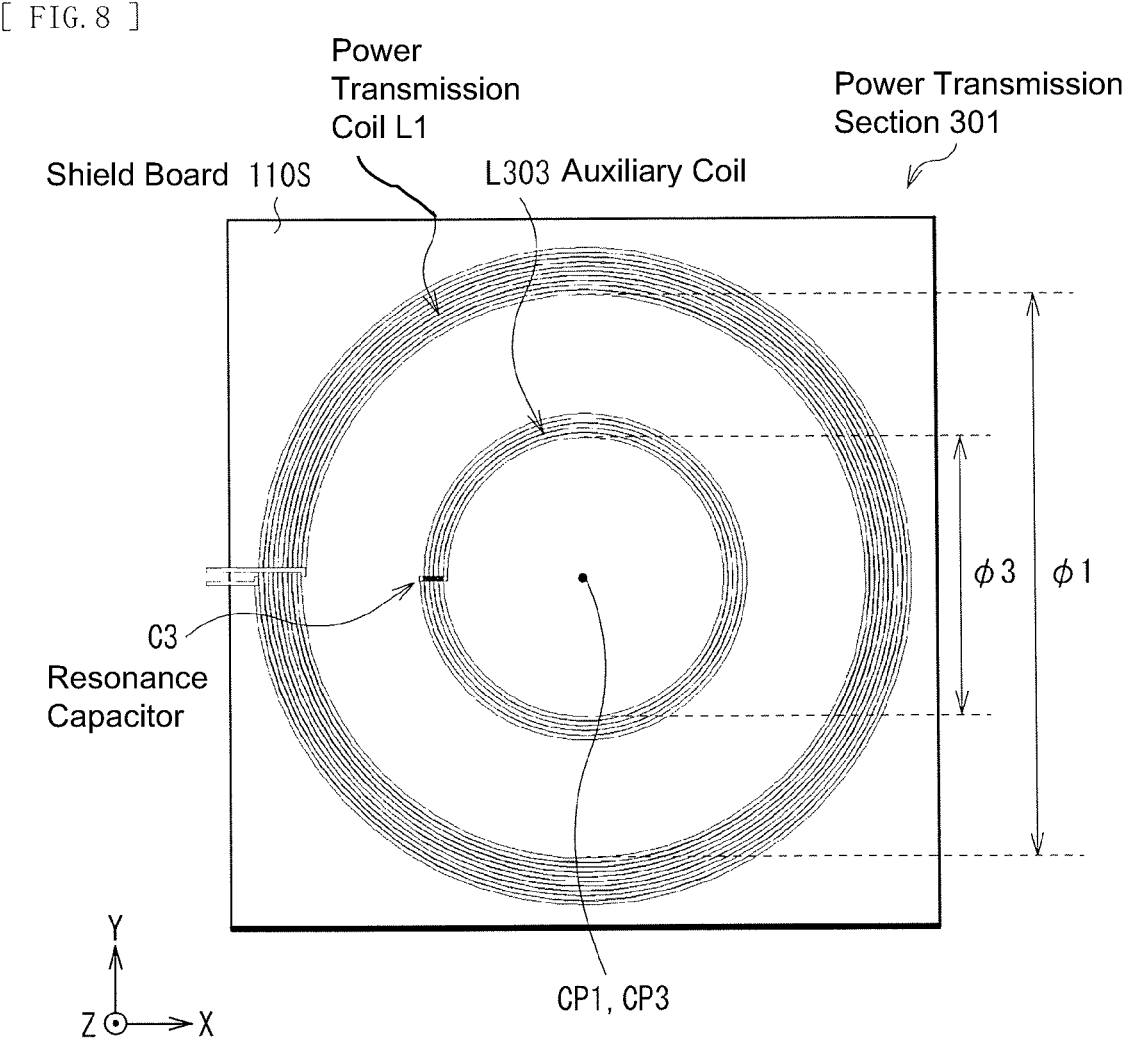
[ FIG. 8 ]

[ FIG. 9 ]
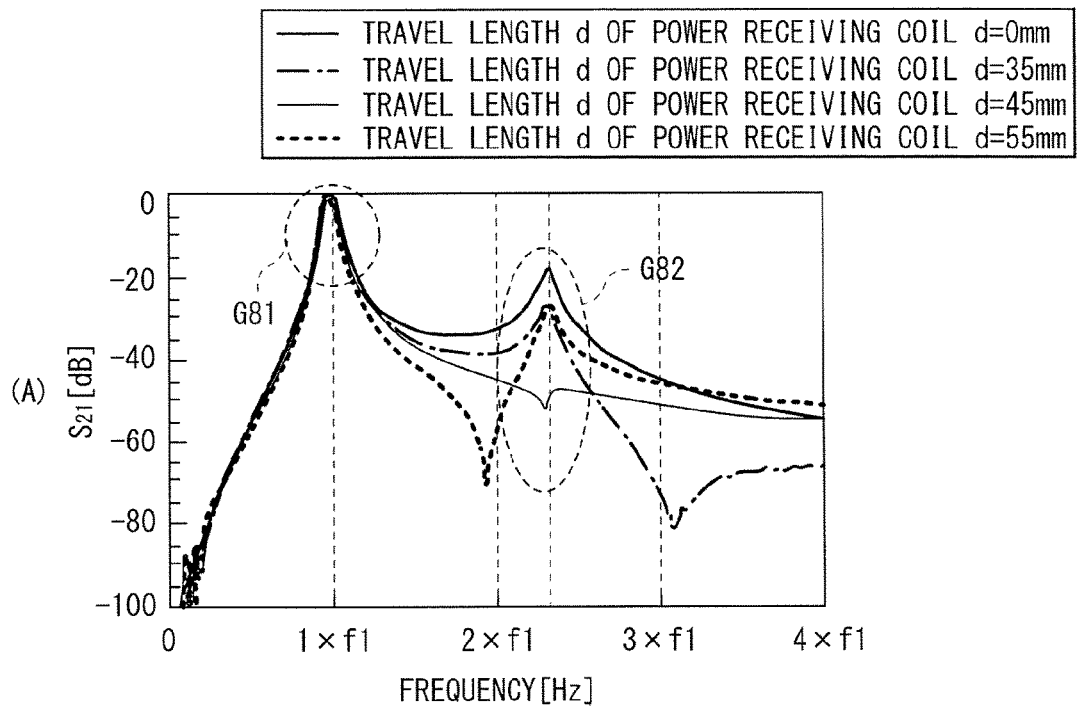
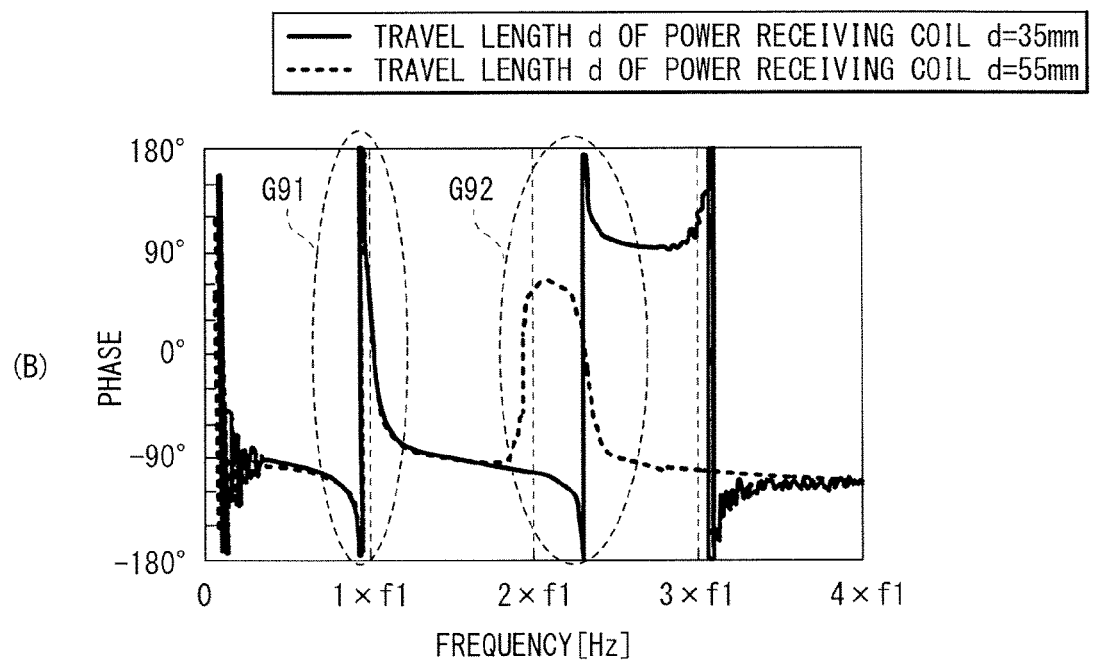

[ FIG. 10 ]
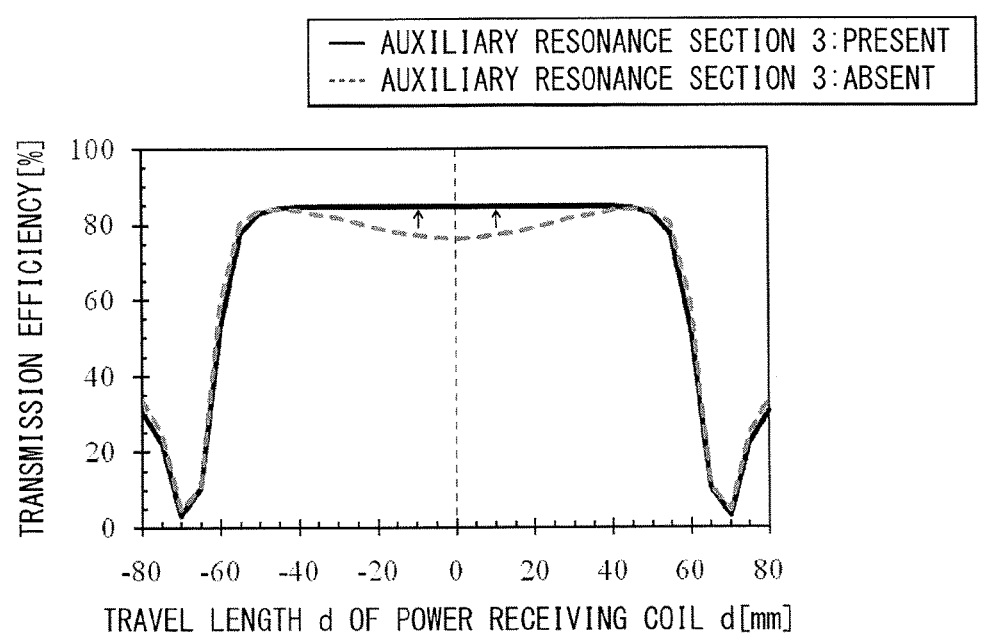

[ FIG. 11 ]
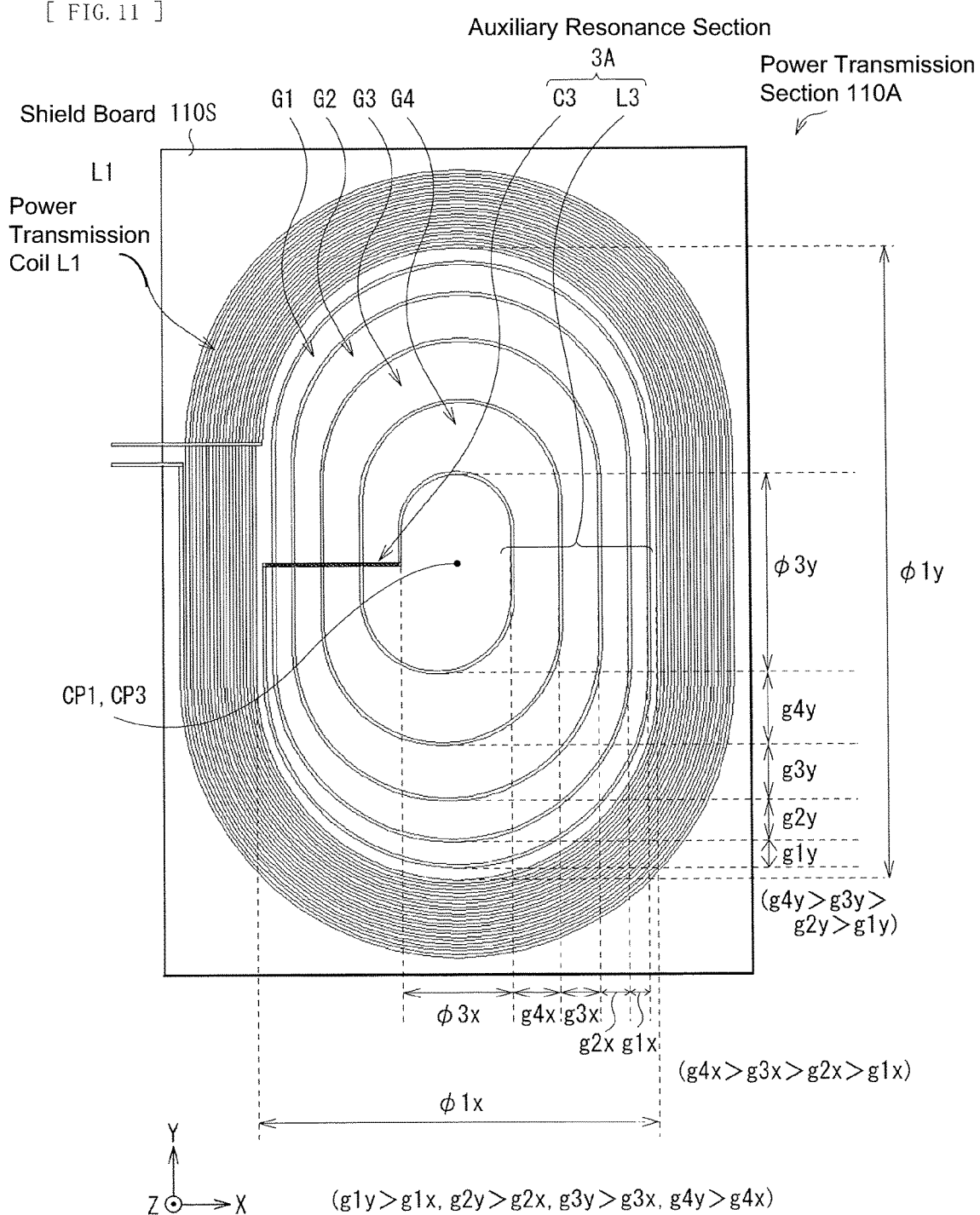

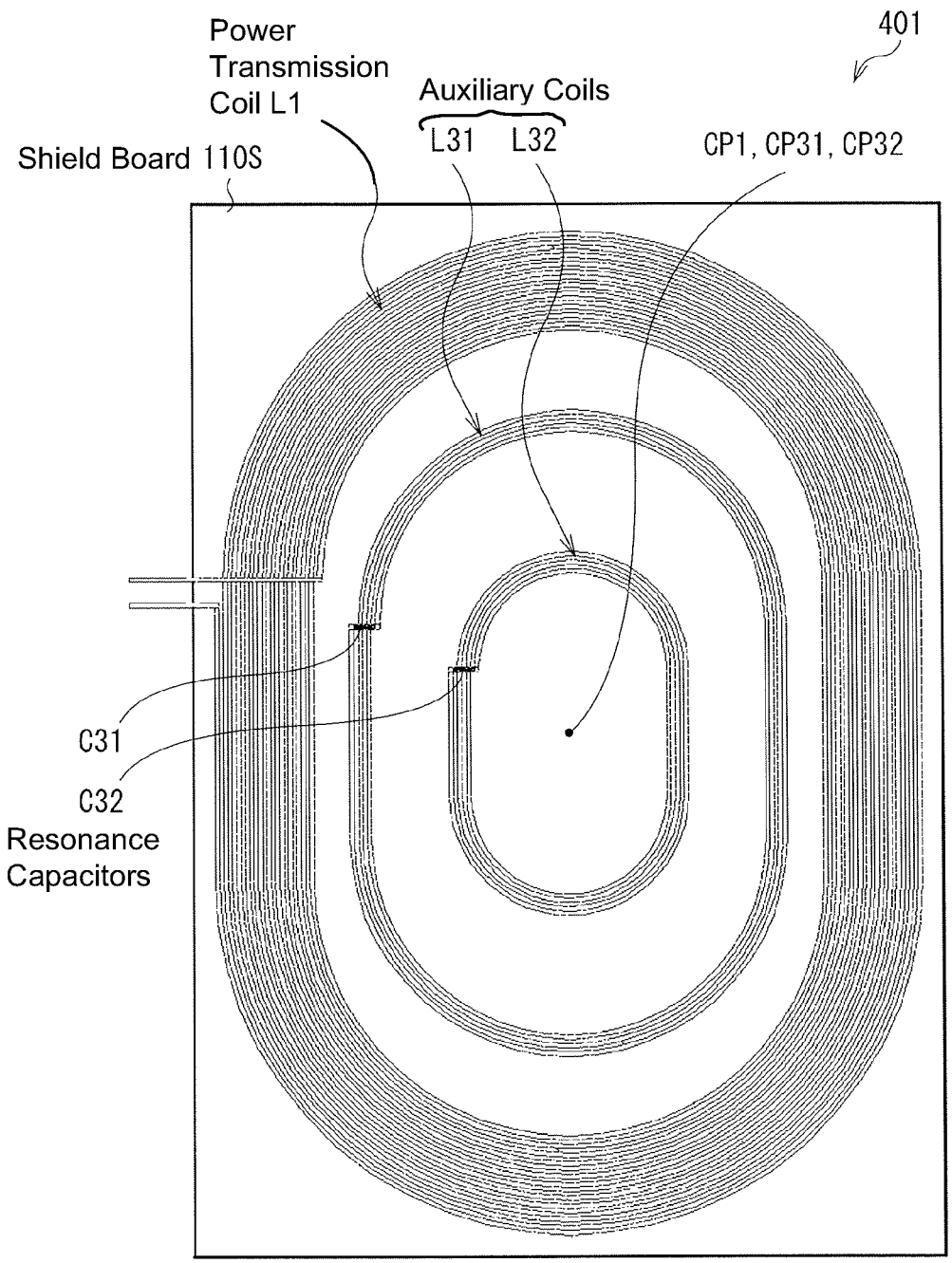
[ FIG. 12 ]

[ FIG. 13 ]
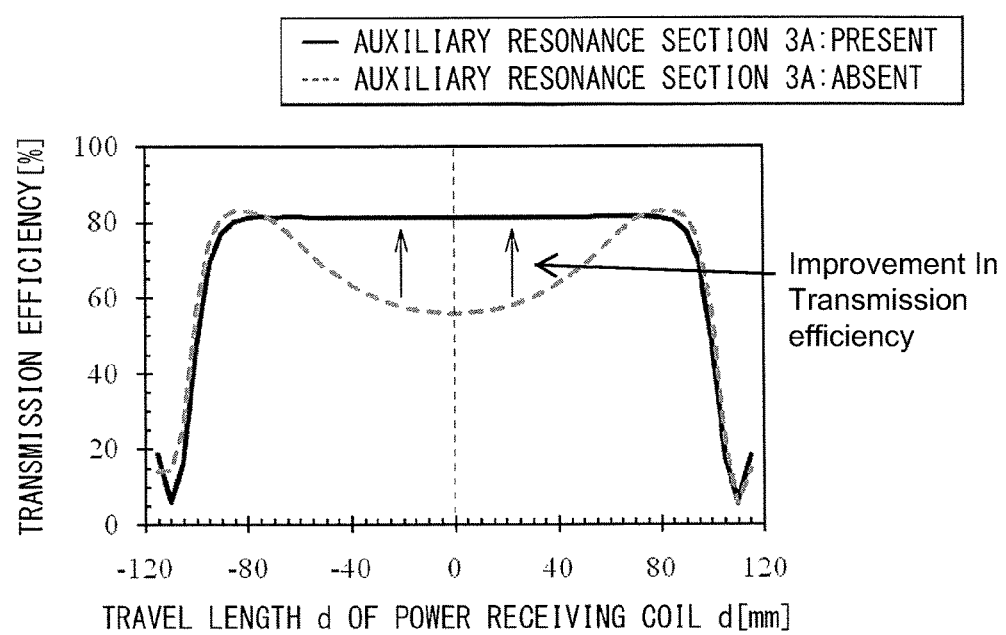

[ FIG. 14 ]
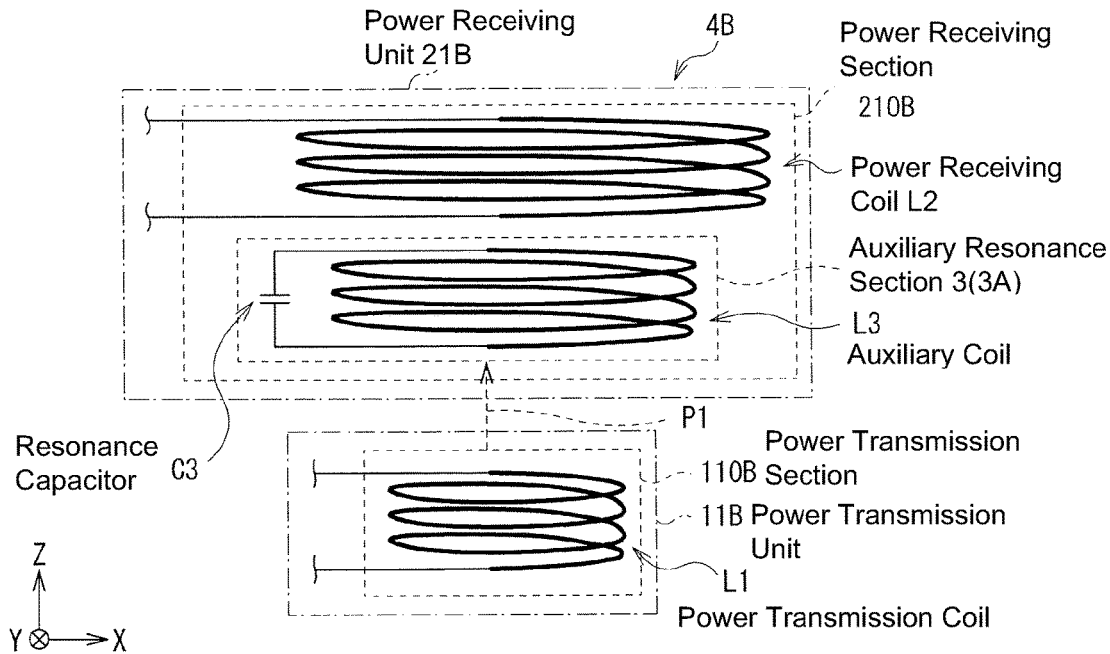
[ FIG. 15 ]
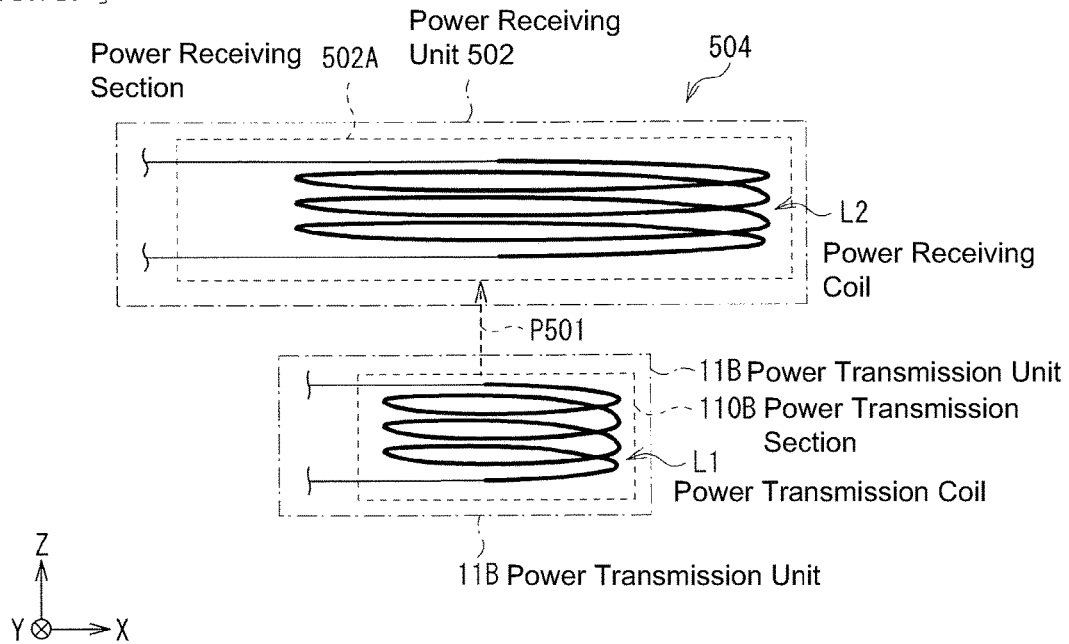

[ FIG. 16 ]
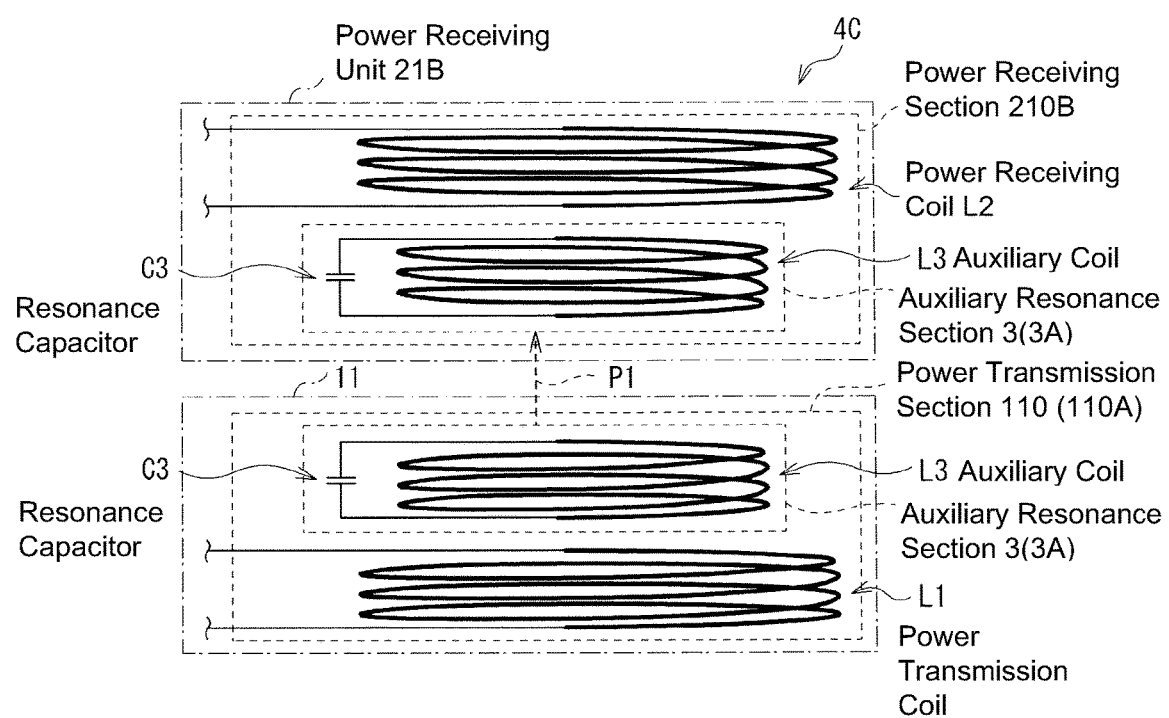

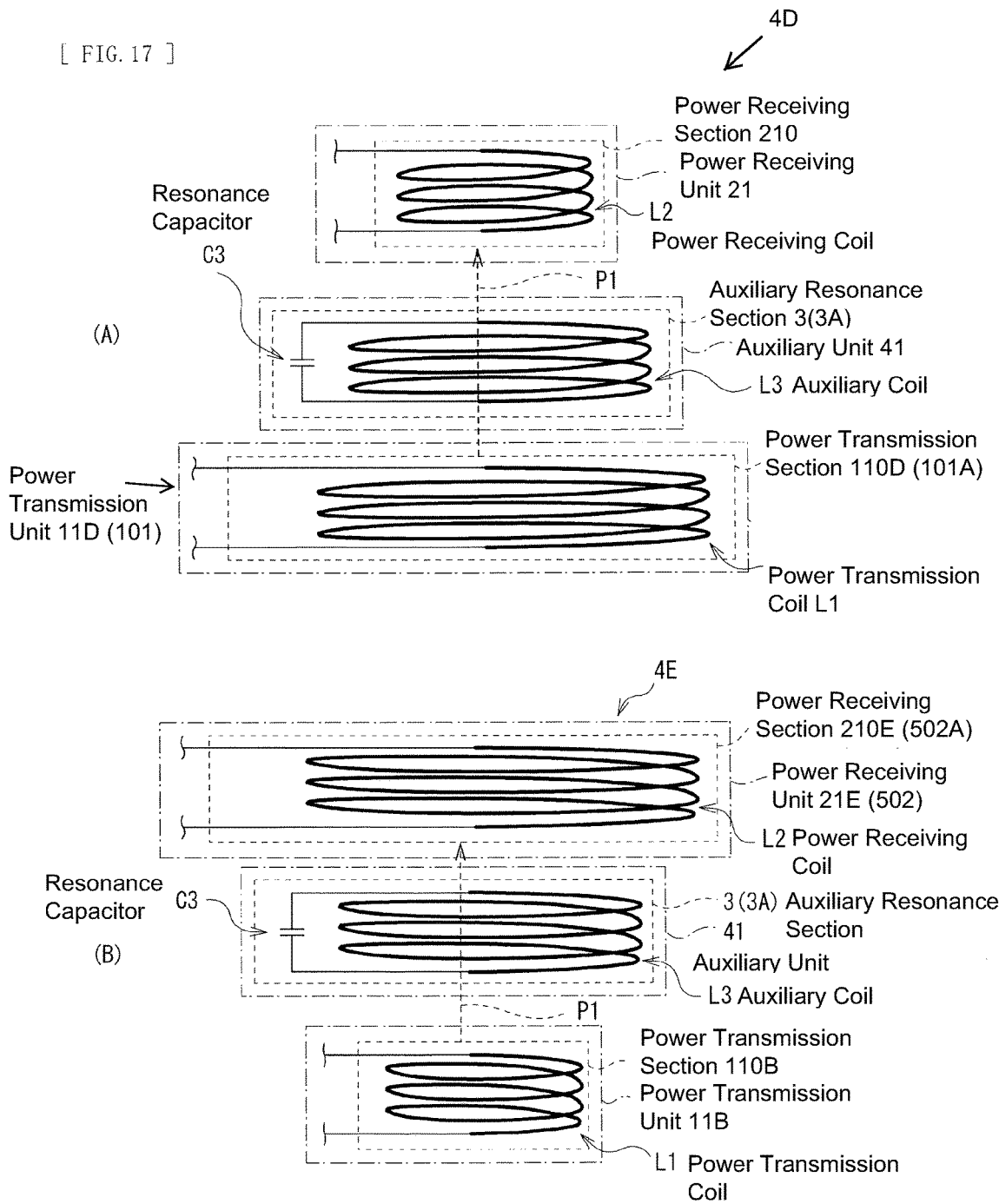
[ FIG. 17 ]

FEED UNIT, FEED SYSTEM, AND ELECTRONIC DEVICE

TECHNICAL FIELD

The present disclosure relates to a feed system that performs non-contact electric power supply (electric power transmission) to an electronic device, as well as a feed unit and an electronic device applied to such a feed system.

BACKGROUND ART

In recent years, attention has been given to a feed system (a non-contact feed system and a wireless charging system) that performs non-contact electric power supply (electric power transmission) to a CE device (Consumer Electronics Device) such as a mobile phone and a portable music player, for example. This makes it possible to start charging merely by placing an electronic device (a secondary-side device) on a charging tray (a primary-side device), instead of starting charging by inserting (connecting) a connector of a power-supply unit such as an AC adapter into the device. In other words, terminal connection between the electronic device and the charging tray becomes unnecessary.

As a method of thus performing non-contact power supply, an electromagnetic induction method is well known. In addition, in recent years, a non-contact feed system using a method called a magnetic resonance method utilizing an electromagnetic resonance phenomenon has also been receiving attention.

Currently, in non-contact feed systems using the electromagnetic induction method which have been already widely used, it is necessary that a feed source (a power transmission coil) and a feed destination (a power receiving coil) share a magnetic flux. Therefore, in order to perform power supply efficiently, it is necessary to dispose the feed source and the feed destination in proximity to each other, and it is also important to align axes in coupling.

Meanwhile, non-contact feed systems using the electromagnetic resonance phenomenon have such advantages that, due to the principle of the electromagnetic resonance phenomenon, electric power transmission is enabled over a longer distance than that in the electromagnetic induction method, and a decrease in transmission efficiency is small even when alignment of axes is poor to some extent. It is to be noted that concerning this electromagnetic resonance phenomenon, there is an electric-field resonance method, besides the magnetic resonance method. In a non-contact feed system of this magnetic-field resonance type (see, for example, Patent Literatures 1 and 2), precise alignment of axes is not necessary, and extending a feeding distance is also possible.

CITATION LIST

Patent Literature

Patent Literature 1: Japanese Unexamined Patent Application Publication No. 2008-136311
Patent Literature 2: Japanese Unexamined Patent Application Publication No. 2009-504115 (Published Japanese Translation of PCT Application)

SUMMARY OF THE INVENTION

Incidentally, in a coil in which a conductive wire rod or the like is wound, in general, the closer to end winding, the denser the magnetic-flux-line (magnetic-flux) distribution is, and the stronger the magnetic field is. Meanwhile, conversely, the farther away from end winding, the non-denser the magnetic-flux-line (magnetic-flux) distribution is, and the weaker the magnetic field is. Therefore, in a coil such as a spiral coil in which a wire rod is wound to be flat, when an inner diameter of the coil is sufficiently large, a magnetic field is strongest in the vicinity of a conductor located at an inner end of the coil, and a magnetic field is relatively weak in the vicinity of the center of the coil. In this way, in general, the magnetic-flux-line distribution generated from a coil is nonuniform.

Here, in the above-described non-contact feed system using the magnetic field (the magnetic resonance and the like), when it is desirable to improve flexibility in a relative position between a primary-side device (on a power transmission side) and a secondary-side device (on a power receiving surface) at the time of electric power transmission (for example, flexibility in placing the secondary-side device on a feeding surface of the primary-side device), there is the following technique. That is, a technique of increasing an inner diameter of a power transmission coil or the like, and expanding a region where magnetic flux lines are distributable.

However, when, for example, the inner diameter of the power transmission coil is relatively large with respect to the inner diameter of the power receiving coil, the magnetic-flux-line distribution (magnetic-flux-density distribution) in an inner region of the power transmission coil is nonuniform as described above. Therefore, there is such an issue that feeding efficiency (transmission efficiency) at the time of non-contact feeding is nonuniform by being dependent on the relative position between the primary-side device and the secondary-side device (for example, the placement of the secondary-side device).

For these reasons, what is desired is to propose a technique that enables, at the time of electric power transmission (non-contact feeding) using a magnetic field, transmission efficiency control according to the position of a device (for example, a reduction in nonuniformity of transmission efficiency distribution according to the relative position described above).

Therefore, it is desirable to provide a feed unit, a feed system, and an electronic device that enable transmission efficiency control according to the position of a device when electric power transmission using a magnetic field is performed between devices.

A feed unit according to an embodiment of the present disclosure includes: a power transmission section including a power transmission coil configured to perform electric power transmission using a magnetic field, and an auxiliary resonance section including one or a plurality of resonators. The resonator includes an auxiliary coil wound to form a gap in at least a partial region.

A feed system according to an embodiment of the present disclosure includes: one or a plurality of electronic devices; and a feed unit configured to perform electric power transmission to the electronic device. The feed unit includes a power transmission section including a power transmission coil configured to perform the electric power transmission using a magnetic field, and the electronic device includes a power receiving section including a power receiving coil configured to receive electric power transmitted from the power transmission section. An auxiliary resonance section including one or a plurality of resonators is provided in at least one of the feed unit, the electronic device, and other unit independent of the feed unit and the electronic device. The resonator includes an auxiliary coil wound to form a gap in at least a partial region.

An electronic device according to an embodiment of the present disclosure includes: a power receiving section including a power receiving coil configured to receive electric power transmitted using a magnetic field, and an auxiliary resonance section including one or a plurality of resonators. The resonator includes an auxiliary coil wound to form a gap in at least a partial region.

In the feed unit, the feed system, and the electronic device according to the embodiments of the present disclosure, the resonator in the auxiliary resonance section includes the auxiliary coil wound to form a gap in at least a partial region. Because such a gap (a gap region) is formed, a change occurs in a relationship (positional characteristics) between a relative position between a feed unit (a power transmission side) and an electronic device (a power receiving side), and transmission efficiency at the time of electric power transmission.

In the feed unit, the feed system, and the electronic device according to the embodiments of the present disclosure, a main resonance frequency in main resonance operation using the power transmission coil at a time of the electric power transmission, and an auxiliary resonance frequency in the resonator may be made different from each other. An adjustment of the difference between such resonance frequencies also causes the change in the positional characteristics. In this case, the auxiliary resonance frequency may be a frequency higher than the main resonance frequency. When thus configured, a variation of the transmission efficiency in response to a change in the relative position (nonuniformity of the transmission efficiency dependent on the relative position) is reduced. In other words, as compared with a case in which the auxiliary resonance frequency and the main resonance frequency are equal to each other, planarization (equalization) of transmission efficiency distribution according to the relative position is achieved.

According to the feed unit, the feed system, and the electronic device of the embodiments of the present disclosure, the resonator in the auxiliary resonance section includes the auxiliary coil wound to form a gap in at least a partial region. Thus, the relationship (the positional characteristics) between the relative position between the power transmission side and the power receiving side, and the transmission efficiency at the time of the electric power transmission is allowed to be changed. Therefore, in performing electric power transmission using a magnetic field between devices, it is possible to perform transmission efficiency control according to the position of a device.

BRIEF DESCRIPTION OF DRAWINGS

FIG. 1 is a perspective view illustrating an appearance configuration example of a feed system according to a first embodiment of the present disclosure.

FIG. 2 is a block diagram illustrating a detailed configuration example of the feed system illustrated in FIG. 1.

FIG. 3 is a schematic diagram illustrating a schematic configuration example of a power transmission section and a power receiving section illustrated in FIG. 1.

FIG. 4 is a diagram including a perspective view and a plan view illustrating a detailed configuration example of the power transmission section illustrated in FIG. 3.

FIG. 5 is a diagram used to describe a relationship between resonance frequencies in the power transmission section illustrated in FIG. 3.

FIG. 6 is a diagram illustrating a schematic configuration and power transmission characteristics of a feed system according to a comparative example 1.

FIG. 7 is a diagram illustrating a schematic configuration and power transmission characteristics of a power transmission section in a feed system according to a comparative example 2.

FIG. 8 is a plan view illustrating a schematic configuration of a power transmission section in a feed system according to a comparative example 3.

FIG. 9 is a characteristic diagram illustrating an example of data according to an Example of the first embodiment.

FIG. 10 is a characteristic diagram illustrating another example of data according to the Example of the first embodiment.

FIG. 11 is a plan view illustrating a schematic configuration of a power transmission section in a feed system according to a second embodiment.

FIG. 12 is a plan view illustrating a schematic configuration of a power transmission section in a feed system according to a comparative example 4.

FIG. 13 is a characteristic diagram illustrating an example of data according to an Example of the second embodiment.

FIG. 14 is a schematic diagram illustrating a schematic configuration example of a feed system according to a third embodiment.

FIG. 15 is a schematic diagram illustrating a schematic configuration example of a feed system according to a comparative example 5.

FIG. 16 is a schematic diagram illustrating a schematic configuration example of a feed system according to a fourth embodiment.

FIG. 17 is a schematic diagram illustrating a schematic configuration example of a feed system according to a fifth embodiment.

MODES FOR CARRYING OUT THE INVENTION

Embodiments of the present disclosure will be described below in detail with reference to the drawings. It is to be noted that the description will be provided in the following order.

1. First embodiment (an example in which an auxiliary resonance section having a resonator is provided in a primary-side device)
2. Second embodiment (another example in which an auxiliary resonance section having a resonator is provided in a primary-side device)
3. Third embodiment (an example in which an auxiliary resonance section is provided in a secondary-side device)
4. Fourth embodiment (an example in which an auxiliary resonance section is provided in each of a primary-side device and a secondary-side device)
5. Fifth embodiment (an example in which an auxiliary resonance section is provided independently of a primary-side device and a secondary-side device)
6. Modifications First Embodiment

[Overall Configuration of Feed System 4]

FIG. 1 illustrates an appearance configuration example of a feed system (a feed system 4) according to a first embodiment of the present disclosure, and FIG. 2 illustrates a block configuration example of this feed system 4. The feed system 4 is a system (a non-contact type feed system) that performs electric power transmission (power supply or feeding) in a non-contact manner by using a magnetic field (by utilizing magnetic resonance or the like; likewise hereinafter). This feed system 4 includes a feed unit 1 (a primary-side device) and one or a plurality of electronic devices (here, two electronic devices 2A and 2B; secondary-side devices).

In this feed system 4, electric power transmission from the feed unit 1 to the electronic devices 2A and 2B may be performed by placing the electronic devices 2A and 2B on (or, in proximity to) a feeding surface (a power transmission surface) S1 in the feed unit 1, as illustrated in FIG. 1, for example. Here, in consideration of a case where the electric power transmission to the electronic devices 2A and 2B is performed simultaneously or time-divisionally (sequentially), the feed unit 1 is shaped like a mat (a tray) in which the area of the feeding surface S1 is larger than the electronic devices 2A and 2B to be fed and the like.

(Feed Unit 1)

The feed unit 1 is a unit (a charging tray) that performs the electric power transmission to the electronic devices 2A and 2B by using a magnetic field as described above. This feed unit 1 may include, for example, a power transmission unit 11 that includes a power transmission section 110, a high-frequency power generating circuit 111, an impedance matching circuit 112, and a resonance capacitor (a capacitor) C1 as illustrated in FIG. 2, for example.

The power transmission section 110 may include, for example, a power transmission coil (a primary-side coil) L1 and the like to be described later. The power transmission section 110 performs electric power transmission using a magnetic field to the electronic devices 2A and 2B (specifically, a power receiving section 210 that will be described later), by utilizing this power transmission coil L1 and the resonance capacitor C1. Specifically, the power transmission section 110 has a function of emitting a magnetic field (a magnetic flux) from the feeding surface S1 towards the electronic devices 2A and 2B. It is to be noted that a detailed configuration of this power transmission section 110 will be described later (FIG. 3 to FIG. 5).

The high-frequency power generating circuit 111 may be a circuit that generates predetermined high-frequency electric power (an AC signal) used to perform electric power transmission, through use of electric power supplied from a power supply source 9 outside the feed unit 1, for example.

The impedance matching circuit 112 is a circuit that performs impedance matching when electric power transmission is performed. This improves efficiency (transmission efficiency) at the time of the electric power transmission. It is to be noted that depending on configurations of the power transmission coil L1, a power receiving coil L2 that will be described later, the resonance capacitors C1 and C2, and the like, this impedance matching circuit 112 may not be provided.

The resonance capacitor C1 is a capacitor used to configure an LC resonator (a main resonator or a main resonance circuit) together with the power transmission coil L1, and is disposed to be electrically connected to the power transmission coil L1 directly, in parallel, or in a combination of series and parallel. This LC resonator configured of the power transmission coil L1 and the resonance capacitor C1 performs resonance operation (main resonance operation) based on a resonance frequency (a main resonance frequency) f1 made of a frequency that is substantially equal to or in the vicinity of high-frequency electric power generated in the high-frequency power generating circuit 111. Further, a capacitance value of the resonance capacitor C1 is set to realize such a resonance frequency f1. However, the resonance capacitor C1 may not be provided, when the above-described resonance frequency f1 is realized by main resonance operation using a parasitic capacitance component (a stray capacitance component) configured of a line capacity in the power transmission coil L1, a capacity between the power transmission coil L1 and the power receiving coil L2 that will be described later, and the like.

(Electronic Devices 2A and 2B)

The electronic devices 2A and 2B each may be, for example, any of stationary electronic devices represented by television receivers, portable electronic devices containing a rechargeable battery (battery) represented by mobile phones and digital cameras, and the like. As illustrated in, for example, FIG. 2, the electronic devices 2A and 2B each include a power receiving unit 21, and a load 22 that performs predetermined operation (operation of performing functions of serving as the electronic device) based on electric power supplied from this power receiving unit 21. Further, the power receiving unit 21 includes a power receiving section 210, an impedance matching circuit 212, a rectifier circuit 213, a voltage stabilizer 214, a battery 215, and the resonance capacitor (capacitor) C2.

The power receiving section 210 includes the power receiving coil L2 (a secondary-side coil) that will be described later. The power receiving section 210 has a function of receiving electric power transmitted from the power transmission section 110 in the feed unit 1, by utilizing the power receiving coil L2 and the resonance capacitor C2. It is to be noted that a detailed configuration of this power receiving section 210 will be described later (FIG. 3).

The impedance matching circuit 212 is a circuit that performs impedance matching when electric power transmission is performed, as with the impedance matching circuit 112 described above. It is to be noted that this impedance matching circuit 212 may not be provided, depending on configurations of the power transmission coil L1, the power receiving coil L2 that will be described later, the resonance capacitors C1 and C2, and the like.

The rectifier circuit 213 is a circuit that rectifies electric power (AC power) supplied from the power receiving section 210, and generates DC power.

The voltage stabilizer 214 is a circuit that performs predetermined voltage stabilization operation based on the DC power supplied from the rectifier circuit 213, and charges the battery 215 and a battery (not illustrated) in the load 22.

The battery 215 stores electric power according to the charging by the voltage stabilizer 214, and may be configured using, for example, a rechargeable battery (a secondary battery) such as a lithium ion battery. It is to be noted that this battery 215 may not be necessarily provided, in a case in which, for example, only the battery in the load 22 is used.

The resonance capacitor C2 is a capacitor used to configure an LC resonator (a main resonator, or a main resonance circuit) together with the power receiving coil L2, and is disposed to be electrically connected to the power receiving coil L2 directly, in parallel, or in a combination of series and parallel. This LC resonator configured of the power receiving coil L2 and the resonance capacitor C2 performs resonance operation based on a resonance frequency f2 made of a frequency that is substantially equal to or in the vicinity of high-frequency electric power generated in the high-frequency power generating circuit 111. In other words, the LC resonator provided in the power transmission unit 11, which is configured using the power transmission coil L1 and the resonance capacitor C1, and the LC resonator provided in the power receiving unit 21, which is configured using the power receiving coil L2 and the resonance capacitor C2, perform the main resonance operation at the resonance frequencies (f1≈f2) that are substantially equal to each other. Further, a capacitance value of the resonance capacitor C2 is set to realize such a resonance frequency f2. However, the resonance capacitor C2 may not be provided either, when the above-described resonance frequency f2 is realized by main resonance operation using a parasitic capacitance component configured of a line capacity in the power receiving coil L2, a capacity between the power transmission coil L1 and the power receiving coil L2, and the like.

[Detailed Configuration of Power Transmission Section 110 and Power Receiving Section 210]

FIG. 3 schematically illustrates a schematic configuration of each of the power transmission section 110 and the power receiving section 210. The power transmission section 110 includes the power transmission coil L1 and an auxiliary resonance section 3, and the power receiving section 210 includes the power receiving coil L2.

The power transmission coil L1 is a coil provided to perform electric power transmission (to generate a magnetic flux) using a magnetic field, as described above. On the other hand, the power receiving coil L2 is a coil provided to receive the electric power transmitted from the power transmission section 110 (from the magnetic flux).

The auxiliary resonance section 3 performs predetermined resonance operation (auxiliary resonance operation), and here includes one LC resonator (an auxiliary resonator, or an auxiliary resonance circuit) configured using one auxiliary coil L3 and one resonance capacitor (a capacitor) C3. In the following, a resonance frequency (an auxiliary resonance frequency) at the time of the auxiliary resonance operation in the LC resonator in this auxiliary resonance section 3 is assumed to be f3. It is to be noted that this resonance capacitor C3 in the auxiliary resonance section 3 may not be provided either, in cases such as a case in which a predetermined parasitic capacitance component is used in place thereof.

(Detailed Configuration of Power Transmission Section 110)

FIG. 4 illustrates a detailed configuration example of the power transmission section 110, Part (A) of FIG. 4 illustrates a perspective configuration example, and Part (B) of FIG. 4 illustrates a plane configuration example (an X-Y plane configuration example). In the power transmission section 110, the power transmission coil L1 and the auxiliary coil L3 which are described above are disposed on a flat-shaped shield board 110S, to be insulated (insulated physically and electrically) from each other.

The shield board 110S is provided to prevent an unnecessary magnetic flux leakage into a region (here, downward) where there is no coupling (magnetic coupling) with the power receiving coil L2, and is made of a magnetic substance, a conductive material, or the like. However, such a shield board 110S may not be provided in some cases.

Here, in the power transmission section 110, the power transmission coil L1 and the auxiliary coil L3 are disposed substantially in the same surface (here, a surface (the same plane) of the shield board 110S). However, a disposition configuration is not limited thereto, and, for example, the auxiliary coil L3 may be disposed on a plane displaced from a coil surface of the power transmission coil L1, along a vertical direction (a Z-axis direction) thereof. In other words, the power transmission coil L1 and the auxiliary coil L3 may be disposed in planes different from each other. In a case of such disposition, flexibility of design (disposition) of the auxiliary resonance section 3 improves. On the other hand, when the power transmission coil L1 and the auxiliary coil L3 are disposed substantially in the same surface as illustrated in FIG. 4, a reduction in thickness of the power transmission section 110 is achieved. In the following, the description will be provided using an example in which these coils are disposed in the same plane.

Further, as illustrated in FIG. 4, a center point CP1 of the power transmission coil L1 and a center point CP3 of the auxiliary coil L3 are located substantially on the same axis (the Z-axis) (here, substantially the same point) with respect to each other. Thus, a structure of the power transmission section 110 that includes the power transmission coil L1 and the auxiliary coil L3 is substantially symmetric in an X-axis direction and a Y-axis direction, making it easier to achieve planarization (equalization) of transmission efficiency distribution according to a relative position (here, a placement position of each of the electronic devices 2A and 2B relative to the feed unit 1) that will be described later. In addition, an inner diameter φ3 of the auxiliary coil L3 is made smaller than an inner diameter φ1 of the power transmission coil L1 (φ3<φ1). This makes it possible to reinforce a magnetic field in the vicinity of a central part of the power transmission coil L1, which is relatively weak when the auxiliary coil L3 is not present. In this way, the power transmission coil L1 and the auxiliary coil L3 are formed to have concentric circular shapes whose respective inner diameters are different from each other.

Here, in the auxiliary coil L3 in the auxiliary resonance section 3 of the present embodiment, a winding is provided to form a gap in at least a partial region (a gap region). In other words, on a winding plane of the auxiliary coil L3 (here, an X-Y plane), a cavity section is provided between the wire rods that configure this auxiliary coil L3. Specifically, in the example illustrated in FIG. 4, a plurality of gaps (here, three gaps G1 to G3) are formed from an outer edge side (an outer circumference side) towards an inner edge side (an inner circumference side), in the auxiliary coil L3. Specifically, in this auxiliary coil L3, a winding is non-densely provided to form the plurality of gaps G1 to G3 continuously from an inner edge to an outer edge thereof. In addition, in this auxiliary coil L3, widths of the gaps G1 to G3 (gap widths g1 to g3) become gradually larger in a direction from the outer edge side towards the center of the auxiliary coil L3. In other words, the gap width g1 of the gap G1, the gap width g2 of the gap G2, and the gap width g3 of the gap G3 are set to satisfy a relation of g3>g2>g1. Such a gap (the gap region) may be configured using, for example, a synthetic resin, a natural resin, a magnetic substance, and the like, besides air (a hollow).

It is to be noted that configurations of the power transmission coil L1 and the auxiliary coil L3 in the power transmission section 110 are not limited to those illustrated in Part (A) and Part (B) of FIG. 4. For example, the entire formation region of the auxiliary coil L3 (the entire region ranging from the inner edge to the outer edge) may not be necessarily provided with a gap, and at least a partial region may be provided with a gap. However, from the viewpoint of transmission efficiency control according to the position of the device which will be described later, it may be desirable to continuously form the plurality of gaps ranging from the inner edge to the outer edge of the auxiliary coil L3, as described above. Further, the widths of the gaps G1 to G3 (the gap widths g1 to g3) may be substantially equal to each other (g3≈g2≈g1) or, contrary to the above case, may become gradually smaller in a direction from the outer edge side towards the center of the auxiliary coil L3 (g3<g2<g1).

However, from the viewpoint of transmission efficiency control according to the position of the device which will be described later, it is desirable to provide setting that satisfies the relation of g3>g2>g1 as described above, in this case as well. Further, each of the power transmission coil L1 and the auxiliary coil L3 may be, for example, a coil of a clockwise winding, or a coil of a counterclockwise winding, and the respective winding directions may not be necessarily the same. Furthermore, displaced disposition not to locate the center point CP1 of the power transmission coil L1 and the center point CP3 of the auxiliary coil L3 on the same axis may be adopted. In that case, it is possible to intentionally provide unevenness to the transmission efficiency distribution according to the relative position (here, the placement position of each of the electronic devices 2A and 2B relative to the feed unit 1) that will be described later. In addition, the inner diameter φ3 of the auxiliary coil L3 may be equal to or more than the inner diameter φ1 of the power transmission coil L1 (φ3>φ1). In that case, although a maximum value of the transmission efficiency decreases, it is possible to expand a region where non-contact feeding is enabled by relatively high transmission efficiency.

(Relationship Between Resonance Frequencies f1 and f3)

Further, in the present embodiment, desirably, the resonance frequency f1 (≈f2) in the main resonance operation using the power transmission coil L1 at the time of the electric power transmission and the resonance frequency f3 in the LC resonator in the auxiliary resonance section 3 may be different from each other (f1≈f3), as illustrated in Part (A) and Part (B) of FIG. 5.

Specifically, for example, as illustrated in Part (A) of FIG. 5, the resonance frequency f3 may be a frequency higher than the resonance frequency f1 (≈f2) (f3>f1). Alternatively, for example, as illustrated in Part (B) of FIG. 5, the resonance frequency f3 may be a frequency lower than the resonance frequency f1 (≈f2) (f3<f1).

At this moment, as will be described later in detail, desirably, the resonance frequency f3 may be, for example, 1.1 times or more and 5.0 times or less the resonance frequency f1 (≈f2) (1.1≤(f3/f1)≤5.0), and more desirably, 1.25 times or more and 3.00 times or less (1.25≤(f3/f1)≤3.00). One reason is that this makes it easy to achieve planarization (equalization) of the transmission efficiency distribution according to the relative position (here, the placement position of each of the electronic devices 2A and 2B relative to the feed unit 1) which will be described later.

[Functions and Effects of Feed System 4]

(1. Summary of Overall Operation)

In this feed system 4, the predetermined high-frequency electric power (the AC signal) used to perform the electric power transmission is supplied from the high-frequency power generating circuit 111 to the power transmission coil L1 and the resonance capacitor C1 (the LC resonator) in the power transmission section 110, in the feed unit 1. This causes the magnetic field (the magnetic flux) in the power transmission coil L1 in the power transmission section 110. At this moment, when the electronic devices 2A and 2B each serving as a device to be fed (a device to be charged) are placed on (or, in proximity to) the top surface (the feeding surface S1) of the feed unit 1, the power transmission coil L1 in the feed unit 1 and the power receiving coil L2 in each of the electronic devices 2A and 2B are in proximity to each other in the vicinity of the feeding surface S1.

In this way, when the power receiving coil L2 is placed in proximity to the power transmission coil L1 generating the magnetic field (the magnetic flux), an electromotive force is generated in the power receiving coil L2 by being induced by the magnetic flux generated by the power transmission coil L1. In other words, due to electromagnetic induction or magnetic resonance, the magnetic field is generated by forming interlinkage with each of the power transmission coil L1 and the power receiving coil L2. As a result, electric power transmission from the power transmission coil L1 side (a primary side, the feed unit 1 side, or the power transmission section 110 side) to the power receiving coil L2 side (a secondary side, the electronic devices 2A and 2B side, or the power receiving section 210 side) is performed (see electric power P1 in FIG. 2). At this moment, on the feed unit 1 side, the main resonance operation (the resonance frequency f1) using the power transmission coil L1 and the resonance capacitor C1 is performed, and on the electronic devices 2A and 2B side, the main resonance operation (the resonance frequency f2≈f1) using the power receiving coil L2 and the resonance capacitor C2 is performed.

Then, in each of the electronic devices 2A and 2B, the AC power received by the power receiving coil L2 is supplied to the rectifier circuit 213 and the voltage stabilizer 214, and the following charging operation is performed. That is, after this AC power is converted into predetermined DC power by the rectifier circuit 213, the voltage stabilization operation based on this DC power is performed by the voltage stabilizer 214, and the charging of the battery 215 or the battery (not illustrated) in the load 22 is performed. In this way, in each of the electronic devices 2A and 2B, the charging operation based on the electric power received by the power receiving section 210 is performed.

In other words, in the present embodiment, at the time of charging the electronic devices 2A and 2B, terminal connection to an AC adapter or the like, for example, may be unnecessary, and it is possible to start the charging easily by merely placing the electronic devices 2A and 2B on (or in proximity to) the feeding surface S1 of the feed unit 1 (non-contact feeding is performed). This reduces burden on a user.

(2. Actions of Auxiliary Resonance Section 3)

Next, functions of the auxiliary resonance section 3, which is one of characteristic parts in the present embodiment, will be described in detail in comparison with a comparative example (comparative examples 1 to 3).

Comparative Example 1

FIG. 6 illustrates a schematic configuration of a feed system (a feed system 104) (Part (A) of FIG. 6) and power transmission characteristics (Part (B) of FIG. 6) according to a comparative example 1. The feed system 104 of this comparative example 1 is a system that performs non-contact electric power transmission using a magnetic field, as with the feed system 4 (see electric power P101 in Part (A) of FIG. 6). The feed system 104 includes a feed unit (not illustrated) having a power transmission unit 101, and an electronic device (not illustrated) having a power receiving unit 21.

As illustrated in Part (A) of FIG. 6, the power transmission unit 101 includes the power transmission coil L1, but does not include the auxiliary resonance section 3 unlike the power transmission unit 11. This brings the following disadvantage in the comparative example 1. That is, for example, as illustrated in, Part (B) of FIG. 6, magnetic-flux-line distribution (magnetic-flux-density distribution) in an inner region of the power transmission coil L1 becomes nonuniform, and feeding efficiency (transmission efficiency) at the time of electric power transmission (non-contact feeding) becomes nonuniform depending on a relative position (here, the position of a secondary-side device) of each of a primary-side device and a secondary-side device. A reason for this is as follows. That is, in a coil in which a conductive wire rod is wound, in general, the closer to end winding, the denser the magnetic-flux-line (magnetic-flux) distribution is, and the stronger the magnetic field is. On the other hand, conversely, the farther away from end winding, the non-denser the distribution of the magnetic flux lines is, and the weaker the magnetic field is. Therefore, in a coil such as a spiral coil in which a wire rod is wound to be flat, when an inner diameter of the coil is sufficiently large, a magnetic field is strongest in the vicinity of a conductor located at an inner end of the coil, and a magnetic field is relatively weak at a position in the vicinity of the center of the coil (see the magnetic-flux-density distribution in Part (B) of FIG. 6). In this way, in the comparative example 1, the magnetic-flux-line distribution generated from the power transmission coil L1 is nonuniform.

Thus, in the comparative example 1, transmission efficiency at the time of the electric power transmission is nonuniform by being dependent on the relative position between the primary-side device and the secondary-side device (here, the position of the secondary-side device). This causes a decline in flexibility of the relative position (here, flexibility of placing the secondary-side device on the feeding surface of the primary-side device) at the time of the electric power transmission, and impairs convenience of a user. It is to be noted that, in the following, a relationship between the relative position between the primary-side device (the feed unit, or the power transmission side) and the secondary-side device (the electronic device, or the power receiving surface), and the transmission efficiency at the time of the electric power transmission, is defined and described as "positional characteristics".

Comparative Example 2

Meanwhile, in a feed system according to the comparative example 2, electric power transmission (non-contact feeding) is performed using a power transmission section 201A having a plane configuration (an X-Y plane configuration) illustrated in Part (A) of FIG. 7, for example. This power transmission section 201A includes a power transmission coil L201 configured of two coils (split coils) of an outer circumference coil L201A and an inner circumference coil L201B. In other words, in this power transmission coil L201, the outer circumference coil L201A and the inner circumference coil L201B are disposed a predetermined distance (an inner diameter difference) apart from each other over. However, in this power transmission coil L201, unlike the power transmission coil L1 and the auxiliary coil L3 (which are physically and electrically insulated) of the present embodiment described above, the outer circumference coil L201A and the inner circumference coil L201B are connected (not insulated) physically and electrically.

By using the power transmission coil L201 configured of such split coils, in the power transmission section 201A, as illustrated in the magnetic-flux-density distribution in Part (B) of FIG. 7, for example, magnetic induction distribution is equalized to some extent (see double-line arrows in the figure), as compared with a case in which split coils are not used (for example, a case in which the inner circumference coil L201B is not present). This is because, as indicated with arrows of broken lines and solid lines in Part (B) of FIG. 7, in an inner region of the inner circumference coil L201B, a direction of a magnetic flux generated by the outer circumference coil L201A and a direction of a magnetic flux generated by the inner circumference coil L201B are set to be the same (here, a forward direction on a Z-axis).

However, in the feed system of the comparative example 2, there is such an issue that, due to such setting of the directions of the magnetic fluxes, a placement region (a dead band) where transmission efficiency is considerably reduced may be present, depending on the relative position (here, the position of a secondary-side device (a power receiving coil)) at the time of the electric power transmission. Specifically, a reason for this is as follows. That is, first, when the power receiving coil is placed in a region in and above the inner circumference coil L201B, in this region, the directions of the magnetic fluxes by the outer circumference coil L201A and the directions of the magnetic fluxes by the inner circumference coil L201B agree with each other (in the forward direction on the Z-axis) as described above. Therefore, due to the presence of the inner circumference coil L201B, more magnetic fluxes pass in the power receiving coil. Thus, as described above, a decrease in the magnetic flux density in the inner region (in the vicinity of a coil center) of the inner circumference coil L201B is eased to some extent.

Meanwhile, when the power receiving coil is placed in a region in and above a gap between the outer circumference coil L201A and the inner circumference coil L201B, the directions of the magnetic fluxes by the outer circumference coil L201A and the directions of the magnetic fluxes by the inner circumference coil L201B disagree with each other and are partially opposite to each other. Describing using an extreme example, as indicated with the arrows of the solid lines and the broken lines in Part (B) of FIG. 7, the directions of the magnetic fluxes by the outer circumference coil L201A and the directions of the magnetic fluxes by the inner circumference coil L201B become all opposite to each other. In this case, the magnetic fluxes (magnetic flux lines) are partially offset equivalently and therefore, an increase in the magnetic flux density is suppressed to some extent in the vicinity of an inner end of the outer circumference coil L201A. However, the directions of the magnetic fluxes equivalently passing through the power receiving coil are determined by a balance between the magnetic flux density of the magnetic flux lines generated from the outer circumference coil L201A and the magnetic flux density of the magnetic flux lines generated from the inner circumference coil L201B, in the vicinity of the power receiving coil. Then, when the power receiving coil is placed at a position where these directions of the magnetic fluxes (the magnetic flux density) are completely the same as described above, the magnetic fluxes are offset equivalently not to pass through the power receiving coil and thus, the transmission efficiency considerably decreases, which substantially disables the non-contact feeding.

In this way, in the feed system of the comparative example 2, the placement region (a dead band) where the transmission efficiency considerably decreases may be present, depending on the relative position (the position of the secondary-side device) at the time of the electric power transmission. It is to be noted that when split coils similar to those of the comparative example 2 are used as the power transmission coil, the same high-frequency electric power is applied to each of the outer circumference coil and the inner circumference coil and thus, such an issue of occurrence of a dead band is not avoidable.

Comparative Example 3

Meanwhile, in a feed system according to the comparative example 3, electric power transmission (non-contact feeding) is performed using a power transmission section 301 having a plane configuration (an X-Y plane configuration) as illustrated in FIG. 8, for example. In this power transmission section 301 of the comparative example 3, in a manner similar to that in the power transmission section 110 of the present embodiment, the power transmission coil L1 and an auxiliary coil L303 are arranged on the shield board 110S to be insulated (insulated physically and electrically) from each other. However, unlike the auxiliary coil L3 in the power transmission section 110, the auxiliary coil L303 in this power transmission section 301 is wound densely not to form a gap in the entire region ranging from an inner edge to an outer edge thereof.

For this reason, in this feed system of the comparative example 3, in cases such as a case where an inner diameter φ1 of the power transmission coil L1 in the power transmission section 301 is considerably large, an effect in an auxiliary resonance section including the auxiliary coil L303 is reduced, or a large number of such auxiliary resonance sections are necessary. Here, in the case where the large number of auxiliary resonance sections (the auxiliary coil L303 and the resonance capacitor C3) are provided, there arise issues such as increases in component cost and manufacturing cost, and a slight decline in a maximum value of transmission efficiency due to heat loss by resistance in the inside of components.

Present Embodiment

In contrast, in the present embodiment, the above-described issues in the comparative examples 2 and 3, for example, are addressed by providing, in the power transmission section 110, the auxiliary resonance section 3 including the auxiliary coil L3 (physically and electrically insulated from the power transmission coil L1) configured as illustrated in FIG. 3 to FIG. 5, for example.

Specifically, in the present embodiment, first, the LC resonator in the auxiliary resonance section 3 includes the auxiliary coil L3 which is wound to form the gaps (the gaps G1 to G3) in at least a partial region as illustrated in Part (A) and Part (B) of FIG. 4. Because such gaps G1 to G3 (the gap region) are formed, a change occurs in the relationship (the positional characteristics) between the relative position between the feed unit 1 (the power transmission side) and the electronic devices 2A and 2B (the power receiving side) (here, the position of each of the electronic devices 2A and 2B), and the transmission efficiency at the time of the electric power transmission. This is because providing such gaps makes a coupling coefficient (a magnetic coupling coefficient), which is one of main parameters that determine the transmission efficiency, difficult to fluctuate even when the relative position changes (the coupling coefficient hardly depends on the relative position). In addition, such a function is achieved by providing only one auxiliary resonance section 3 and thus, it is possible to reduce the number of components as compared with the above-described comparative example 3. This leads to a reduction in component cost and manufacturing cost, suppression of heat loss due to resistance in the components, and the like.

Further, in the present embodiment, the resonance frequency f1 ($\approx$f2) in the main resonance operation at the time of the electric power transmission using the magnetic field and the resonance frequency f3 in the LC resonator in the auxiliary resonance section 3 are different from each other (f1$\neq$f3), as illustrated in Part (A) and Part (B) of FIG. 5. An adjustment to such a difference between the resonance frequencies f1 and f3 also causes a change in the relationship (the positional characteristics) between the relative position between the feed unit 1 and the electronic devices 2A and 2B (here, the position of each of the electronic devices 2A and 2B), and the transmission efficiency at the time of the electric power transmission. In other words, using the auxiliary resonance operation in the auxiliary resonance section 3, the main resonance operation (positional distribution of the transmission efficiency) at the time of the electric power transmission is controlled.

At this moment, in the case of (f3>f1) in which the resonance frequency f3 is set to be higher than the resonance frequency f1 as illustrated in Part (A) of FIG. 5, for example, a variation of the transmission efficiency in response to the change in the relative position described above (nonuniformity of the transmission efficiency dependent on the relative position) is reduced. In other words, as compared with the case in which the resonance frequencies f1 and f3 are equal to each other (corresponding the above-described comparative example 2), planarization (equalization) of the transmission efficiency distribution according to the relative position is achieved. Specifically, this is because the coupling coefficient (the magnetic coupling coefficient) that is one of the main parameters that determine the transmission efficiency is made difficult to fluctuate even when the relative position changes (the coupling coefficient hardly depends on the relative position). Further, seeing from a different point of view, even when a dead band dependent on the relative position (a placement region where the transmission efficiency is considerably low) is present in the resonance frequency f3 of the auxiliary resonance operation, the electric power transmission is not affected because of the difference from the resonance frequency f1 of the main resonance operation (f1$\neq$f3).

Meanwhile, when the resonance frequency f3 is set to be lower than the resonance frequency f1 (f3<f1) as illustrated in Part (B) of FIG. 5, for example, the distribution of the transmission efficiency in response to the change in the relative position described above may be controlled optionally. Specifically, for example, selectively providing a region where the transmission efficiency is relatively high and a region where the transmission efficiency is relatively low (performing electric power transmission in a selective region on the feeding surface S1) may be achievable.

Example of First Embodiment

Here, FIG. 9 and FIG. 10 illustrate various kinds of data according to an Example of the present embodiment. In this Example, the power transmission section 110 configured as illustrated in Part (A) and Part (B) of FIG. 4 was used. Specifically, there were provided an inner diameter φ1 of the power transmission coil L1=120 mm, an inner diameter (an innermost diameter) φ3 of the auxiliary coil L3=40 mm, an outermost diameter of the auxiliary coil L3=114 mm, a winding number n3 in the auxiliary coil L3=5, and the resonance frequency f3=2.3×f1. Further, the power receiving coil L2 having an outer diameter φ=10 mm was placed substantially 6 mm away from the top surface of the power transmission coil L1 in the vertical direction (the Z-axis direction). It is to be noted that, on the electronic devices 2A and 2B side, setting was provided to establish the resonance frequency f2$\approx$f1.

First, Part (A) of FIG. 9 illustrates an example of a transmission characteristic change caused by placing the power receiving coil L2. Specifically, the transmission characteristics in a case in which the power receiving coil L2 was moved relative to the above-described position (a travel length d) in a horizontal direction (in the X-Y plane) were measured. The position of the travel length d=0 mm corresponds to a point on a vertical axis with respect to the center points CP1 and CP3 of the power transmission coil L1 and the auxiliary coil L3. Here, $S_{21}$ (an S parameter) of the vertical axis is a parameter related to the feeding efficiency (the transmission efficiency). It is found from this Part (A) of FIG. 9 that even when the position (the travel length d) of the power receiving coil L2 changes, $S_{21}$ (the transmission efficiency) hardly changes at the frequency (1×f1) in the vicinity of the resonance frequency f1 at the time of the electric power transmission (see a reference numeral G81 in the figure). Meanwhile, it is found that at a frequency (2.3×f1) in the vicinity of the resonance frequency f2 in the auxiliary resonance section 3, $S_{21}$ (the transmission efficiency) changes to a great extent (see a reference numeral G82 in the figure), and placement in which $S_{21}$ (the transmission efficiency) considerably decreases (corresponding to a dead band) exists.

Further, Part (B) of FIG. 9 illustrates an example of a phase characteristic change caused by placing the power receiving coil L2. It is found from this Part (B) of FIG. 9 that, while there is almost no phase change at the frequency (1×f1) in the vicinity of the resonance frequency f1 at the time of the electric power transmission (see a reference numeral G91 in the figure), there is a large phase change (the phase is reversed) at the frequency (2.3×f1) in the vicinity of the resonance frequency f2 in the auxiliary resonance section 3 (see a reference numeral G92 in the figure).

It is found from the results in these Part (A) and Part (B) of FIG. 9 that when the split coils described in the comparative example 2 are used, phase reversal and a considerable decline in the transmission efficiency are caused by placing the power receiving coil L2, at the frequency (1×f1) in the vicinity of the resonance frequency f1 at the time of the electric power transmission. In other words, it can be said that if the resonance frequencies f1 and f3 are equal to each other (f1=f3), a dead band in the electric power transmission is generated.

Next, FIG. 10 illustrates an example of a positional characteristic (here, characteristics exhibiting a relationship between the travel length d of the power receiving coil L2 and the transmission efficiency) change due to the presence of the auxiliary resonance section 3. It is found from this FIG. 10 that the transmission efficiency in a region in and above the power transmission coil L1 is improved, and substantially uniform transmission efficiency distribution is achieved (see arrows in the figure), by providing the auxiliary resonance section 3.

Further, in a case in which the resonance frequency f3 of the auxiliary resonance operation is changed (when changed within a range of (f3/f1)=0.50 to 3.00), the following can be said about the positional characteristic change. That is, from the viewpoint of equalizing the transmission efficiency distribution, the resonance frequency f3 may be preferably larger than the resonance frequency f1 (f3>f1), more preferably 1.1 times or more and 5.0 times or less and still more preferably 1.25 times or more and 3.00 times or less the resonance frequency f1. Further, for example, in a case of the resonance frequency f3=2.3×f1, the transmission efficiency distribution is equalized most. On the other hand, in a case in which, on the contrary, the resonance frequency f3 is lower than the resonance frequency f1 (f3<f1), the transmission efficiency distribution for the placement (the travel length d) of the power receiving coil L2 may be controlled optionally. For example, in a case of f3=0.50×f1, the transmission efficiency relatively decreases in a region in and above the auxiliary coil L3, and the transmission efficiency relatively increases in a region in and above a gap between the auxiliary coil L3 and the power transmission coil L1. Therefore, electric power transmission in a selective region (here, the region in and above the gap between the auxiliary coil L3 and the power transmission coil L1) on the feeding surface S1 is achievable. It is to be noted that the degree of such a positional characteristic change when the resonance frequency f3 is changed depends on the configuration and disposition of each of the power transmission coil L1 and the auxiliary coil L3, an influence of peripheral metal and peripheral magnetic material in the inside of a housing of the feed unit 1, an influence of metal and a magnetic material used for a housing of each of the electronic devices 2A and 2B, and the like. Therefore, a most suitable value may be set as the resonance frequency f3, in consideration of these influences. In other words, it can be said that the resonance frequency f3 may be set at a frequency so that the phase reversal and the considerable decline in the transmission efficiency described with reference to Part (A) and Part (B) of FIG. 9 do not occur in the vicinity of the resonance frequency f1 at the time of the electric power transmission.

Next, the following can be said about the positional characteristic change when the inner diameter φ3 of the auxiliary coil L3 is changed, or the positional characteristic change when the winding number n3 in the auxiliary coil L3 is changed. That is, it is found that the positional characteristics are allowed to be slightly changed by changing the inner diameter φ3 or the winding number n3 in the auxiliary coil L3. Specifically, a predetermined optimum value exists in the inner diameter φ3 of the auxiliary coil L3, and the transmission efficiency slightly decreases in the region in and above the auxiliary coil L3 when the inner diameter φ3 increases to be larger than the optimum value. In addition, a predetermined optimum value exists in the winding number n3 of the auxiliary coil L3, and the transmission efficiency slightly decreases in the region in and above the auxiliary coil L3 when the winding number n3 increases to be larger than the optimum value. Based upon the foregoing, it can be said that the shape and disposition of the auxiliary coil L3, the resonance frequency f3, and the like are parameters in changing the positional characteristics (equalizing the transmission efficiency distribution), and it is found that, in particular, the resonance frequency f3 is an important parameter.

As described above, in the present embodiment, the LC resonator in the auxiliary resonance section 3 includes the auxiliary coil L3 which is wound to form the gaps in at least a partial region. Thus, the relationship (the positional characteristics) between the relative position between the power transmission side (the feed unit 1) and the power receiving side (the electronic devices 2A and 2B), and the transmission efficiency at the time of the electric power transmission is allowed to be changed. Therefore, it is possible to perform the transmission efficiency control according to the position of the device, when the electric power transmission (non-contact feeding) using a magnetic field is performed between the devices.

In addition, it is possible to obtain such an effect by providing only one auxiliary resonance section 3. Thus, it is possible to reduce the number of components as compared with the comparative example 3, and a reduction in component cost and manufacturing cost, suppression of heat loss due to resistance in the components, and the like are achievable.

Furthermore, in the case in which the resonance frequency f1 in the main resonance operation at the time of the electric power transmission using the magnetic field and the resonance frequency f3 in the LC resonator in the auxiliary resonance section 3 are made different from each other, the relationship (the positional characteristics) between the relative position between the power transmission side (the feed unit 1) and the power receiving side (the electronic devices 2A and 2B), and the transmission efficiency at the time of the electric power transmission is allowed to be changed, by adjusting the difference between those resonance frequencies f1 and f3. Therefore, when the electric power transmission (non-contact feeding) using a magnetic field is performed between the devices, it is possible to perform the transmission efficiency control according to the position of the device, in this case as well.

In particular, when the resonance frequency f3 is set to be higher than the resonance frequency f1 (f3>f1), it is possible to reduce a variation of the transmission efficiency in response to the change of the relative position described above (nonuniformity of the transmission efficiency dependent on the relative position). In other words, planarization (equalization) of the transmission efficiency distribution according to the relative position is achievable, as compared with the case in which the resonance frequencies f1 and f3 are equal to each other (corresponding to the case of the comparative example 2). Therefore, it is possible to configure a non-contact feed system in which there is no dead band in a wide region on the feeding surface S1 and in which substantially uniform transmission efficiency is obtainable. Further, this also makes it possible to obtain effects such as an improvement in feeding stability at the time of the non-contact feeding, an improvement in flexibility in placing the secondary-side device (the electronic devices 2A and 2B), and an improvement in capability of detecting dissimilar metal.

In addition, the following effect is obtained when the inner diameter φ3 of the auxiliary coil L3 is made to be smaller than the inner diameter φ1 of the power transmission coil L1 (φ3<φ1). That is, it is possible to reinforce the magnetic field in the vicinity of the center of the power transmission coil L1, in which the magnetic field is relatively weak when the auxiliary coil L3 is not present, and the transmission efficiency distribution according to the relative position is allowed to be further equalized.

Next, other embodiments (second to fifth embodiments) according to the disclosure will be described. It is to be noted that the same elements as those in the first embodiment will be provided with the same reference numerals as those therein, and the description thereof will be omitted as appropriate.

Second Embodiment

[Configuration of Power Transmission Section 110A]

FIG. 11 illustrates a configuration example (an X-Y plane configuration example) of a power transmission section (a power transmission section 110A) in a feed system according to a second embodiment. In the power transmission section 110A of the present embodiment, the power transmission coil L1 and the auxiliary coil L3 are disposed on the shield board 110S in a manner similar to that in the power transmission section 110 of the first embodiment, to be insulated (insulated physically and electrically) from each other. Further, this power transmission section 110A includes the power transmission coil L1 and an auxiliary resonance section 3A, as with the power transmission section 110. Furthermore, this auxiliary resonance section 3A is provided with one LC resonator configured of one auxiliary coil L3 and one resonance capacitor C3, as with the auxiliary resonance section 3 of the first embodiment.

However, in the present embodiment, unlike the first embodiment, the power transmission coil L1 and the auxiliary coil L3 each have an in-plane shape exhibiting anisotropy (for example, an oval shape, a rectangular shape, an elongated circular shape, or the like) (here, an elongated circular shape).

Here, a winding is provided to form a gap (a gap region) in at least a partial region, in the auxiliary coil L3 in the auxiliary resonance section 3A of the present embodiment as well, in a manner similar to that in the first embodiment. Specifically, in an example illustrated in FIG. 11, a plurality of gaps (here, four gaps G1 to G4) are formed from an outer edge side (an outer circumference side) towards an inner edge side (an inner circumference side) in the auxiliary coil L3. To be more specific, this auxiliary coil L3 is non-densely wound to continuously form the plurality of gaps G1 to G4 ranging from the inner edge to the outer edge thereof. In addition, in this auxiliary coil L3, widths (gap widths) of the respective gaps G1 to G4 gradually increase along a direction from the outer edge side towards the center of the auxiliary coil L3. In other these are set to satisfy a relation of (g4x>g3x>g2x>g1x) and (g4y>g3y>g2y>g1y), when the gap widths of the respective gaps G1 to G4 along a short direction (here, an X-axis direction) in the in-plane shape exhibiting anisotropy are assumed to be g1x, g2x, g3x, and g4x, and the gap widths of the respective gaps G1 to G4 along a longitudinal direction (here, an Y-axis direction) are assumed to be g1y, g2y, g3y, and g4y. Further, in the present embodiment, these widths (the gap widths) of the respective gaps G1 to G4 in the longitudinal direction in the in-plane shape exhibiting anisotropy are larger than those in the short direction. In other words, these are set to satisfy a relation of (g1y>g1x), (g2y>g2x), (g3y>g3x), and (g4y>g4x). Setting in this way makes it possible to achieve equalization of the transmission efficiency distribution according to the relative position described above, more effectively.

It is to be noted that, as with the case of the power transmission section 110 of the first embodiment, the configurations of the power transmission coil L1 and the auxiliary coil L3 in the power transmission section 110A are not limited to those illustrated in FIG. 11 either, and may have other configurations. In other words, for example, at least part of the above-described relations may be set so as not to be satisfied for each gap width.

(Relationship Between Resonance Frequencies f1 and f3)

Here, as with the first embodiment, desirably, the resonance frequency f1 ($\approx$f2) in main resonance operation at the time of electric power transmission using a magnetic field and the resonance frequency f3 in an LC resonator in the auxiliary resonance section 3A may be different from each other (f1$\neq$f3), in the present embodiment as well. Specifically, the resonance frequency f3 is a frequency that is higher than the resonance frequency f1 ($\approx$f2) (f3>f1). Alternatively, the resonance frequency f3 is a frequency that is lower than the resonance frequency f1 ($\approx$f2) (f3<f1).

[Functions and Effects of Feed System 4A]

The LC resonator in the auxiliary resonance section 3A includes the auxiliary coil L3 which is wound to form the gaps in at least a partial region, in the feed system of the present embodiment as well. Therefore, similar effects by similar functions as those of the first embodiment are obtainable. In other words, when the electric power transmission (non-contact feeding) using a magnetic field is performed between the devices, transmission efficiency control according to the position of the device, and the like are allowed to be performed. Further, in the case of (f3>f1) in which the resonance frequency f3 is set to be a frequency higher than the resonance frequency f2 (≈f1), a variation of the transmission efficiency in response to a change in the relative position (nonuniformity of the transmission efficiency dependent on the relative position) is allowed to be reduced.

Furthermore, for example, as compared with a case in which an auxiliary coil (here, two auxiliary coils L31 and L32) that is wound densely not to form a gap in the entire region ranging from an inner edge to an outer edge is used as with a power transmission section (a power transmission section 401) according to a comparative example 4 illustrated in FIG. 12, the following effects are obtained in the present embodiment as well. That is, the above-described effects are allowed to be obtained by providing only one auxiliary resonance section 3A. Thus, the number of components is allowed to be reduced as compared with the comparative example 4, making it possible to achieve a reduction in component cost and manufacturing cost, suppression of heat loss due to resistance in the components, and the like.

Example of Second Embodiment

Here, FIG. 13 is a diagram illustrating data according to an Example of the present embodiment (an example of a positional characteristic change due to the presence or absence of the auxiliary resonance section 3A). In this Example, the power transmission section 110A configured as illustrated in FIG. 11 was used, and an inner diameter (ply in a longitudinal direction=188 mm and an inner diameter φ1x in a short direction=119 mm in the power transmission coil L1 were set. Further, in the auxiliary coil L31, an outermost diameter in a longitudinal direction=180 mm, an outermost diameter in a short direction=115 mm, an inner diameter (an innermost diameter) φ3y in the longitudinal direction=58 mm, and an inner diameter (an innermost diameter) φ3x in the short direction=33 mm were set.

It is found from FIG. 13 that, by providing the auxiliary resonance section 3A, the transmission efficiency in a region in and above the power transmission coil L1 is improved (see arrows in the figure), and substantially uniform transmission efficiency distribution is obtained. Further, it is found that, because an inner region of the power transmission coil L1 in the present Example is wider than (the inner diameter is larger) than that in the Example of the first embodiment, the effect of improving equalization of the transmission efficiency distribution is greater than that of the result illustrated in FIG. 10.

Third Embodiment

[Configuration of Feed System 4B]

FIG. 14 illustrates a schematic configuration example of a feed system (a feed system 4B) according to a third embodiment. The feed system 4B of the present embodiment is a system that performs non-contact electric power transmission using a magnetic field, as with the feed system 4.

In the present embodiment, however, unlike the first and second embodiments, an electronic device to be fed (a secondary-side device) is larger than a feed unit (a primary-side device). In other words, this corresponds to a case in which a power receiving surface in the electronic device is larger than a power transmission surface (a feeding surface) in the feed unit.

The feed system 4B includes the feed unit (not illustrated) having a power transmission unit 11B, and one or a plurality of electronic devices (not illustrated) each having a power receiving unit 21B. The power transmission unit 11B includes a power transmission section 110B having the power transmission coil L1, and the power receiving unit 21B includes a power receiving section 210B having the power receiving coil L2 and the auxiliary resonance section 3 (or the auxiliary resonance section 3A). In other words, this power receiving section 210B has one LC resonator configured of one auxiliary coil L3 and one resonance capacitor C3.

Here, configurations of the auxiliary resonance sections 3 and 3A in the present embodiment are basically similar to those described in the first and second embodiments. In other words, the LC resonator in the auxiliary resonance section 3 or 3A includes the auxiliary coil L3 wound to form a gap in at least a partial region. Further, the resonance frequency f2 (≈f1) at the time of main resonance operation in the power receiving unit 21B and the resonance frequency f3 in the LC resonator in the auxiliary resonance section 3 or 3A are different from each other (f2≠f3). Specifically, for example, the resonance frequency f3 may be a frequency higher than the resonance frequency f2 (≈f1) (f3>f2). Alternatively, for example, the resonance frequency f3 may be a frequency lower than the resonance frequency f2 (≈f1) (f3<f2).

[Functions and Effects of Feed System 4B]

In the feed system 4B of the present embodiment, the auxiliary resonance section 3 or 3A is provided and thus, similar effects by similar functions to those of each of the first and second embodiments are obtainable. In other words, it is possible to perform transmission efficiency control according to the position of the device when the electric power transmission (non-contact feeding) using a magnetic field is performed between the devices. Further, in the case of (f3>f1) in which the resonance frequency f3 is set to be a frequency higher than the resonance frequency f2 (≈f1), it is possible to reduce a variation of transmission efficiency in response to a change in a relative position (nonuniformity of the transmission efficiency dependent on the relative position).

In particular, in the present embodiment, the auxiliary resonance section 3 or 3A is provided on the power receiving unit 21B side (the electronic device side). Thus, it is possible to reduce the nonuniformity of the transmission efficiency depending on the placement position (the relative position) of the feed unit, in the power receiving surface of the electronic device.

In other words, as compared with a case in which, for example, as in a feed system (a feed system 504) according to a comparative example 5 illustrated in FIG. 15, the auxiliary resonance section 3 or 3A is not provided on an power receiving unit 502 side having a power receiving section 502A (on an electronic device side), the nonuniformity of the transmission efficiency depending on the placement position of the feed unit in the power receiving surface of the electronic device is allowed to be reduced.

Fourth Embodiment

[Configuration of Feed System 4C]

FIG. 16 illustrates a schematic configuration example of a feed system (a feed system 4C) according to a fourth embodiment. The feed system 4C of the present embodiment is a system that performs non-contact electric power transmission using a magnetic field, as with the feed system 4.

However, unlike the first to third embodiments, the present embodiment corresponds to a case in which a power transmission surface (a feeding surface) and a power receiving surface that are relatively large are provided on both a feed unit (a primary-side device) and an electronic device (a secondary-side device).

The feed system 4C includes a feed unit (not illustrated) having a power transmission unit 11, and one or a plurality of electronic devices (not illustrated) each having a power receiving unit 21B. The power transmission unit 11 includes a power transmission section 110 (or a power transmission section 110A) having the power transmission coil L1 and the auxiliary resonance section 3 (or the auxiliary resonance section 3A), and the power receiving unit 21B includes a power receiving section 210B having the power receiving coil L2 and the auxiliary resonance section 3 (or the auxiliary resonance section 3A). In other words, both the power transmission unit 11 and the power receiving unit 21B include the respective auxiliary resonance sections 3 (or the auxiliary resonance sections 3A) each having one LC resonator configured of one auxiliary coil L3 and one resonance capacitor C3.

Here, configurations of the auxiliary resonance sections 3 and 3A in the present embodiment are basically similar to those described in the first to third embodiments.

[Functions and Effects of Feed System 4C]

In the feed system 4C of the present embodiment, the auxiliary resonance section 3 or 3A is provided and thus, it is possible to obtain similar effects by similar functions to those of each of the first to third embodiments. In other words, it is possible to perform transmission efficiency control according to the position of the device when the electric power transmission (non-contact feeding) using a magnetic field is performed between the devices. Further, in a case of (f3>(f1, f2)) in which the resonance frequency f3 is set to be a frequency higher than the resonance frequencies f1 and f2, it is possible to reduce a variation of transmission efficiency in response to a change in a relative position (nonuniformity of the transmission efficiency dependent on the relative position).

In particular, in the present embodiment, the auxiliary resonance section 3 or 3A is provided on both the power transmission unit (the feed unit) side and the power receiving unit (the electronic device) side. Thus, it is possible to reduce the nonuniformity of the transmission efficiency, which depends on the placement position of the electronic device in the power transmission surface (the feeding surface) of the feed unit, as well as the placement position of the feed unit in the power receiving surface of the electronic device (the relative position).

Fifth Embodiment

[Configurations of Feed Systems 4D and 4E]

Part (A) and Part (B) of FIG. 17 each illustrate a schematic configuration example of a feed system (each of feed systems 4D and 4E) according to a fifth embodiment. Each of the feed systems 4D and 4E of the present embodiment is a system that performs non-contact electric power transmission using a magnetic field, as with the feed system 4.

In the present embodiment, however, unlike the first to fourth embodiments, the auxiliary resonance section 3 or the auxiliary resonance section 3A is provided in other unit (an auxiliary unit 41 that will be described later) independent of a feed unit (a primary-side device) and an electronic device (a secondary-side device). In other words, the feed systems of the present embodiment each include the feed unit, one or a plurality of electronic devices, and the auxiliary unit having an auxiliary resonance section.

The feed system 4D illustrated in Part (A) of FIG. 17 includes the feed unit (not illustrated) having a power transmission unit 11D, one or a plurality of electronic devices (not illustrated) each having a power receiving unit 21, and the auxiliary unit 41 having the auxiliary resonance section 3 or the auxiliary resonance section 3A. Further, the power transmission unit 11D includes a power transmission section 110D having the power transmission coil L1, and the power receiving unit 21 includes a power receiving section 210 having the power receiving coil L2. In other words, the auxiliary unit 41 independent of the feed unit (the power transmission unit 11D) and the electronic device (the power receiving unit 21) includes the auxiliary resonance section 3 or the auxiliary resonance section 3A having one LC resonator configured of one auxiliary coil L3 and one resonance capacitor C3. It is to be noted that the power transmission unit 11D and the power transmission section 110D have configurations similar to those of the power transmission unit 101 and the power transmission section 101A described above, respectively.

The feed system 4E illustrated in Part (B) of FIG. 17 includes the feed unit (not illustrated) having a power transmission unit 11B, one or a plurality of electronic devices (not illustrated) each having a power receiving unit 21E, and the auxiliary unit 41 having the auxiliary resonance section 3 or the auxiliary resonance section 3A. Further, the power transmission unit 11B includes the power transmission section 110B having the power transmission coil L1, and the power receiving unit 21E includes a power receiving section 210E having the power receiving coil L2. In other words, the auxiliary unit 41 independent of the feed unit (the power transmission unit 11B) and the electronic device (the power receiving unit 21E) includes the auxiliary resonance section 3 or the auxiliary resonance section 3A having one LC resonator configured of one auxiliary coil L3 and one resonance capacitor C3. It is to be noted that the power receiving unit 21E and the power receiving section 210E have configurations similar to those of the power receiving unit 502 and the power receiving section 502A described above, respectively.

[Functions and Effects of Feed Systems 4D and 4E]

In the feed systems 4D and 4E of the present embodiment, the auxiliary resonance section 3 or 3A is provided and thus, it is possible to obtain similar effects by similar functions to those of each of the first to fourth embodiments. In other words, it is possible to perform transmission efficiency control according to the position of the device when the electric power transmission (non-contact feeding) using a magnetic field is performed between the devices. Further, in a case of (f3>(f1, f2)) in which the resonance frequency f3 is set to be a frequency higher than the resonance frequencies f1 and f2, it is possible to reduce a variation of transmission efficiency in response to a change in a relative position (nonuniformity of the transmission efficiency dependent on the relative position).

In particular, in the present embodiment, the auxiliary resonance section 3 or the auxiliary resonance section 3A is provided in other unit (the auxiliary unit 41) independent of the power transmission unit and the electronic device. Thus, it is possible to obtain the above-described effects, by merely adding the auxiliary unit 41 to a typical (existing) non-contact feed system.

[Modifications]

The present technology has been described above with reference to some embodiments, but the present technology is not limited to these embodiments and may be variously modified.

For example, the above-described embodiments have been described with reference to the case in which one LC resonator is included in the auxiliary resonance section, but are not limited to this case. For example, a plurality of (two or more) LC resonators may be included in the auxiliary resonance section. Further, in the above-described embodiments and the like, each coil (the power transmission coil, the power receiving coil, and the auxiliary coil) is assumed to have a spiral shape (a planar shape), but each coil may be configured to have, for example, an a-winding shape in which a spiral coil is folded to be in two layers, a spiral shape having more multiple layers, a helical shape in which a winding is wound in a thickness direction, etc. For example, when the power transmission coil is configured using any of these shapes, equalization of the transmission efficiency is achieved in substantially a whole area on the top surface (the feeding surface) of the power transmission coil. In addition, each coil (the power transmission coil, the power receiving coil, and the auxiliary coil) may be not only a winding coil configured using a wire rod having conductivity, but also a pattern coil having conductivity and configured using a printed circuit board, a flexible printed circuit board, etc. It is to be noted that, in place of the auxiliary coil having a coil shape, a conductive loop having a loop shape may be used to configure the LC resonator.

Further, each of the resonance capacitors (in particular, the resonance capacitor in the auxiliary resonance section) is not limited to the case of using a fixed electrostatic capacitance value, and may have a configuration in which an electrostatic capacitance value is allowed to be variable (for example, a configuration of switching between connection paths of a plurality of capacitors). When such a configuration is adopted, control (optimization) of a resonance frequency is allowed to be performed by adjusting the electrostatic capacitance value.

Furthermore, the auxiliary resonance section described above in each of the above-described embodiments and the like may be provided in at least one of the feed unit, the electronic device, the other unit independent of the feed unit and the electronic device.

In addition, in the above-described embodiments, each component of the feed unit, the electronic device, and the like has been specifically described, but it is not necessary to provide all the components, or other components may be further provided. For example, a communication function, a function of performing some kind of control, a display function, a function of authenticating a secondary-side device, a function of detecting the secondary-side device being on the primary-side device, a function of detecting a mixture such as dissimilar metal, and/or the like may be provided in the feed unit and/or the electronic device.

Further, the above-described embodiments have been described by taking the case in which the plurality of (two) electronic devices are provided in the feed system as an example, but are not limited to this case, and only one electronic device may be provided in the feed system.

Furthermore, the above-described embodiments have been described by taking the charging tray for the small electronic device (the CE device) such as a mobile phone, as an example of the feed unit, but the feed unit is not limited to such a home charging tray, and may be applicable to battery chargers of various kinds of electronic devices.

Moreover, it is not necessarily for the feed unit to be a tray, and may be, for example, a stand for an electronic device such as a so-called cradle.

It is to be noted that the present technology may also have the following configurations.

(1) A feed unit including:
a power transmission section including a power transmission coil configured to perform electric power transmission using a magnetic field, and an auxiliary resonance section including one or a plurality of resonators, wherein
the resonator includes an auxiliary coil wound to form a gap in at least a partial region.

(2) The feed unit according to (1), wherein the auxiliary coil is formed with the plurality of gaps.

(3) The feed unit according to (2), wherein widths of the gaps become larger gradually from an outer edge side towards a center of the auxiliary coil.

(4) The feed unit according to (2) or (3), wherein the auxiliary coil is non-densely wound to form the plurality of gaps ranging from an inner edge to an outer edge thereof.

(5) The feed unit according to any one of (1) to (4), wherein
the auxiliary coil has an in-place shape exhibiting anisotropy,
a width of the gap is larger in a longitudinal direction than in a short direction in the in-plane shape.

(6) The feed unit according to any one of (1) to (5), wherein the auxiliary resonance section includes the single resonator.

(7) The feed unit according to (6), wherein an inner diameter of the auxiliary coil is smaller than an inner diameter of the power transmission coil.

(8) The feed unit according to (6) or (7), wherein a center point of the power transmission coil and a center point of the auxiliary coil are located substantially on a same axis.

(9) The feed unit according to any one of (6) to (8), wherein the power transmission coil and the auxiliary coil are disposed substantially in a same plane.

(10) The feed unit according to any one of (1) to (9), wherein a main resonance frequency in main resonance operation using the power transmission coil at a time of the electric power transmission, and an auxiliary resonance frequency in the resonator are different from each other.

(11) The feed unit according to (10), wherein the auxiliary resonance frequency is a frequency higher than the main resonance frequency.

(12) The feed unit according to (10), wherein the auxiliary resonance frequency is a frequency lower than the main resonance frequency.

(13) The feed unit according to any one of (1) to (12), wherein the power transmission coil and the auxiliary coil are electrically insulated.

(14) The feed unit according to any one of (1) to (13), wherein the main resonance operation is performed using the power transmission coil, and a predetermined capacitor or a parasitic capacitance component.

(15) A feed system including:
one or a plurality of electronic devices; and
a feed unit configured to perform electric power transmission to the electronic device, wherein
the feed unit includes a power transmission section including a power transmission coil configured to perform the electric power transmission using a magnetic field,
the electronic device includes a power receiving section including a power receiving coil configured to receive electric power transmitted from the power transmission section,
an auxiliary resonance section including one or a plurality of resonators is provided in at least one of the feed unit, the electronic device, and other unit independent of the feed unit and the electronic device, and the resonator includes an auxiliary coil wound to form a gap in at least a partial region.

(16) The feed system according to (15), wherein the auxiliary resonance section is provided in an auxiliary unit serving as the other unit.

(17) The feed system according to (15) or (16), wherein a main resonance frequency in main resonance operation using the power transmission coil or the power receiving coil at a time of the electric power transmission, and an auxiliary resonance frequency in the resonator are different from each other.

(18) An electronic device including:

a power receiving section including a power receiving coil configured to receive electric power transmitted using a magnetic field, and an auxiliary resonance section including one or a plurality of resonators, wherein the resonator includes an auxiliary coil wound to form a gap in at least a partial region.

(19) The electronic device according to (18), wherein a main resonance frequency in main resonance operation using the power receiving coil at a time of the electric power transmission, and an auxiliary resonance frequency in the resonator are different from each other.

(20) The electronic device according to (18) or (19), wherein the main resonance operation is performed using the power receiving coil, and a predetermined capacitor or a parasitic capacitance component.

The present application claims priority based on Japanese Patent Application No. 2011-112349 filed in the Japan Patent Office on May 19, 2011, the entire contents of which is hereby incorporated by reference.

The invention claimed is:

1. A feed unit, comprising:
a power transmission section that includes a power transmission coil configured to transmit electric power by a magnetic field; and
an auxiliary resonance section that includes at least one resonator,
wherein the at least one resonator includes an auxiliary coil of a plurality of windings,
wherein the auxiliary coil is wound such that at least one gap is created between a first winding of the plurality of windings and a second winding of the plurality of windings,
wherein the first winding is adjacent to the second winding,
wherein a first width of the at least one gap in a first axis direction is larger than a second width of the at least one gap in a second axis direction, and
wherein the second axis direction is orthogonal to the first axis direction.

2. The feed unit according to claim 1,
wherein the auxiliary coil is wound such that a plurality of gaps is created between the plurality of windings, and
wherein the plurality of gaps includes the at least one gap.

3. The feed unit according to claim 2, wherein widths of the plurality of gaps from an outer edge of the auxiliary coil to a center of the auxiliary coil continuously increase.

4. The feed unit according to claim 2, wherein the plurality of gaps is between an inner edge of the auxiliary coil and an outer edge of the auxiliary coil.

5. The feed unit according to claim 1, wherein the auxiliary resonance section includes a single resonator.

6. The feed unit according to claim 1, wherein a first inner diameter of the auxiliary coil is smaller than a second inner diameter of the power transmission coil.

7. The feed unit according to claim 1, wherein a first center point of the power transmission coil and a second center point of the auxiliary coil are on a same axis.

8. The feed unit according to claim 1, wherein the power transmission coil and the auxiliary coil are in a same plane.

9. The feed unit according to claim 1,
wherein the power transmission coil is further configured to transmit the electric power at a main resonance frequency, and
wherein the at least one resonator is configured to transmit the electric power at an auxiliary resonance frequency different from the main resonance frequency.

10. The feed unit according to claim 9, wherein the auxiliary resonance frequency is higher than the main resonance frequency.

11. The feed unit according to claim 9, wherein the auxiliary resonance frequency is lower than the main resonance frequency.

12. The feed unit according to claim 1, wherein the power transmission coil and the auxiliary coil are electrically insulated.

13. The feed unit according to claim 1, further comprising one of a resonance capacitor or a parasitic capacitor,
wherein the power transmission coil is further configured to transmit the electric power in a main resonance operation with one of the resonance capacitor or the parasitic capacitor.

14. A feed system, comprising:
at least one electronic device that comprises a power receiving coil configured to receive electric power; and
a feed unit configured to transmit the electric power to the at least one electronic device, wherein the feed unit comprises:
a power transmission section, wherein the power transmission section includes a power transmission coil configured to transmit the electric power by a magnetic field; and
an auxiliary resonance section that includes at least one resonator,
wherein the at least one resonator includes an auxiliary coil of a plurality of windings,
wherein the auxiliary coil is wound such that at least one gap is created between a first winding of the plurality of windings and a second winding of the plurality of windings,
wherein the first winding is adjacent to the second winding;
wherein a first width of the at least one gap in a first axis direction is larger than a second width of the at least one gap in a second axis direction, and
wherein the second axis direction is orthogonal to the first axis direction.

15. The feed system according to claim 14, wherein the auxiliary resonance section is in an auxiliary unit that is independent of the power transmission section and the at least one electronic device.

16. The feed system according to claim 14,
wherein the feed unit is further configured to transmit the electric power in a main resonance operation which uses one of the power transmission coil or the power receiving coil at a main resonance frequency, and
wherein the at least one resonator is configured to transmit the electric power at an auxiliary resonance frequency different from the main resonance frequency.

17. An electronic device, comprising:
a power receiving section that includes a power receiving coil configured to receive electric power transmitted by a magnetic field; and
an auxiliary resonance section that includes at least one resonator,
   wherein the at least one resonator includes an auxiliary coil of a plurality of windings,
   wherein the auxiliary coil is wound such that at least one gap is created between a first winding of the plurality of windings and a second winding of the plurality of windings,
   wherein the first winding is adjacent to the second winding,
   wherein a first width of the at least one gap in a first axis direction is larger than a second width of the at least one gap in a second axis direction, and
   wherein the second axis direction is orthogonal to the first axis direction.

18. The electronic device according to claim 17,
   wherein the power receiving coil is further configured to receive the electric power at a main resonance frequency, and
   wherein the at least one resonator is configured to receive the electric power at an auxiliary resonance frequency different from the main resonance frequency.

19. The electronic device according to claim 17, further comprising one of a resonance capacitor or a parasitic capacitor,
   wherein the power receiving coil is further configured to receive the electric power in a main resonance operation with one of the resonance capacitor or the parasitic capacitor.

* * * * *